US011289799B2

(12) United States Patent
Everest et al.

(10) Patent No.: US 11,289,799 B2
(45) Date of Patent: Mar. 29, 2022

(54) BASE STATION ANTENNAS WITH COMPACT REMOTE ELECTRONIC TILT ACTUATORS FOR CONTROLLING MULTIPLE PHASE SHIFTERS

(71) Applicant: CommScope Technologies LLC, Hickory, NC (US)

(72) Inventors: Paul D. Everest, Flower Mound, TX (US); Sean G. Thomas, McKinney, TX (US); Amit Kaistha, Coppell, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/048,171

(22) PCT Filed: Apr. 12, 2019

(86) PCT No.: PCT/US2019/027274

§ 371 (c)(1),
(2) Date: Oct. 16, 2020

(87) PCT Pub. No.: WO2019/212721

PCT Pub. Date: Nov. 7, 2019

(65) Prior Publication Data

US 2021/0159589 A1 May 27, 2021

Related U.S. Application Data

(60) Provisional application No. 62/665,031, filed on May 1, 2018.

(51) Int. Cl.

*H04B 7/04* (2017.01)
*H01Q 3/32* (2006.01)

(Continued)

(52) U.S. Cl.

CPC ............. *H01Q 1/246* (2013.01); *H01P 1/184* (2013.01); *H01Q 3/32* (2013.01); *H01Q 21/08* (2013.01); *H01Q 21/26* (2013.01)

(58) Field of Classification Search

CPC .......... H01Q 1/22; H01Q 1/246; H01Q 21/06; H01Q 21/08; H01Q 21/26; H01Q 3/30;

(Continued)

(56) References Cited

U.S. PATENT DOCUMENTS

| | | | | |
|---|---|---|---|---|
| 10,050,341 B2 * | 8/2018 | Lee | H04B 17/17 | |
| 2010/0164803 A1 * | 7/2010 | Ahlberg | H01Q 1/246 342/372 | |

(Continued)

FOREIGN PATENT DOCUMENTS

| | | | |
|---|---|---|---|
| DE | 102011009600 B3 * | 3/2012 | H01Q 1/246 |
| WO | 2017218396 | 12/2017 | |

(Continued)

OTHER PUBLICATIONS

International Search Report and the Written Opinion of the International Searching Authority corresponding to International Patent Application No. PCT/US2019/027274 (11 pages) dated Jul. 3, 2019).

*Primary Examiner* — Blane J Jackson
(74) *Attorney, Agent, or Firm* — Myers Bigel, P.A.

(57) ABSTRACT

Base station antennas include a RET actuator, a plurality of phase shifters and a plurality of mechanical linkages, where each mechanical linkage is connected between the RET actuator and a respective one or more of the phase shifters. The RET actuator includes a drive element, a rotatable element and a mechanical linkage selection system that is configured to move a selected one of the mechanical linkages into engagement with the drive element. The drive element is configured to move linearly in response to (Continued)

rotation of the rotatable element to move the selected one of the mechanical linkages.

27 Claims, 9 Drawing Sheets

(51) Int. Cl.

| | |
|---|---|
| ***H01Q 1/22*** | (2006.01) |
| ***H01Q 21/08*** | (2006.01) |
| ***H01Q 1/24*** | (2006.01) |
| ***H01P 1/18*** | (2006.01) |
| ***H01Q 21/26*** | (2006.01) |

(58) Field of Classification Search
CPC .... H01Q 3/32; H04B 7/04; H01P 1/18; H01P 1/184
See application file for complete search history.

(56) References Cited

U.S. PATENT DOCUMENTS

2016/0380348 A1* 12/2016 Li .......................... H01Q 3/005 455/562.1
2016/0380821 A1* 12/2016 Liu .......................... H04B 7/04 455/562.1
2017/0244157 A1* 8/2017 Muehlbauer ........... H01Q 1/246
2017/0365923 A1 12/2017 Schmutzler et al.

FOREIGN PATENT DOCUMENTS

WO WO-2017218608 A1 * 12/2017 ............. F16H 25/20
WO WO-2020061275 A1 * 3/2020 ............... H01Q 3/32

* cited by examiner

ROTATE MOTOR IN 1ST DIRECTION TO MOVE A SELECTED MECHANICAL LINKAGE INTO ENGAGEMENT WITH A DRIVE SYSTEM
600

ROTATE MOTOR IN 2ND DIRECTION TO MOVE THE SELECTED MECHANICAL LINKAGE
610

BASE STATION ANTENNAS WITH COMPACT REMOTE ELECTRONIC TILT ACTUATORS FOR CONTROLLING MULTIPLE PHASE SHIFTERS

RELATED APPLICATIONS

This application is a 35 USC § 371 US national stage application of PCT/US2019/027274, filed Apr. 12, 2019, which claims the benefit of and priority to U.S. Provisional Application Ser. No. 62/665,031, filed May 1, 2018, the contents of which are hereby incorporated by reference as if recited in full herein.

FIELD OF THE INVENTION

The present invention relates to communication systems and, in particular, to base station antennas having remote electronic tilt capabilities.

BACKGROUND

Cellular communications systems are used to provide wireless communications to fixed and mobile subscribers (herein "users"). A cellular communications system may include a plurality of base stations that each provide wireless cellular service for a specified coverage area that is typically referred to as a "cell." Each base station may include one or more base station antennas that are used to transmit radio frequency ("RF") signals to, and receive RF signals from, the users that are within the cell served by the base station. Base station antennas are directional devices that can concentrate the RF energy that is transmitted in certain directions (or received from those directions). The "gain" of a base station antenna in a given direction is a measure of the ability of the antenna to concentrate the RF energy in that particular direction. The "radiation pattern" of a base station antenna is compilation of the gain of the antenna across all different directions. The radiation pattern of a base station antenna is typically designed to service a pre-defined coverage area such as the cell or a portion thereof that is typically referred to as a "sector." The base station antenna may be designed to have minimum gain levels throughout its pre-defined coverage area, and it is typically desirable that the base station antenna have much lower gain levels outside of the coverage area to reduce interference between sectors/cells. Early base station antennas typically had a fixed radiation pattern, meaning that once a base station antenna was installed, its radiation pattern could not be changed unless a technician physically reconfigured the antenna. Unfortunately, such manual reconfiguration of base station antennas after deployment, which could become necessary due to changed environmental conditions or the installation of additional base stations, was typically difficult, expensive and time-consuming.

More recently, base station antennas have been deployed that have radiation patterns that can be reconfigured from a remote location by transmitting control signals to the antenna. Base station antennas having such capabilities are typically referred to as remote electronic tilt ("RET") antennas. The most common changes to the radiation pattern are changes in the down tilt angle (i.e., the elevation angle) and/or the azimuth angle. RET antennas allow wireless network operators to remotely adjust the radiation pattern of the antenna by transmitting control signals to the antenna that electronically alter the RF signals that are transmitted and received by the antenna.

Base station antennas typically comprise a linear array or a two-dimensional array of radiating elements such as patch, dipole or crossed dipole radiating elements. In order to electronically change the down tilt angle of these antennas, a phase taper may be applied across the radiating elements of the array, as is well understood by those of skill in the art. Such a phase taper may be applied by adjusting the settings on an adjustable phase shifter that is positioned along the RF transmission path between a radio and the individual radiating elements of the base station antenna. One widely-used type of phase shifter is an electromechanical "wiper" phase shifter that includes a main printed circuit board and a "wiper" printed circuit board that may be rotated above the main printed circuit board. Such wiper phase shifters typically divide an input RF signal that is received at the main printed circuit board into a plurality of sub-components, and then capacitively couple at least some of these sub-components to the wiper printed circuit board. The sub-components of the RF signal may be capacitively coupled from the wiper printed circuit board back to the main printed circuit board along a plurality of arc-shaped traces, where each arc has a different diameter. Each end of each arc-shaped trace may be connected to a radiating element or to a sub-group of radiating elements. By physically (mechanically) rotating the wiper printed circuit board above the main printed circuit board, the locations where the sub-components of the RF signal capacitively couple back to the main printed circuit board may be changed, which thus changes the length of the respective transmission path from the phase shifter to an associated radiating element for each sub-component of the RF signal. The changes in these path lengths result in changes in the phases of the respective sub-components of the RF signal, and since the arcs have different radii, the phase changes along the different paths will be different. Thus, the above-described wiper phase shifters may be used to apply a phase taper to the sub-components of an RF signal that are applied to each radiating element (or sub-group of radiating elements). Exemplary phase shifters of this variety are discussed in U.S. Pat. No. 7,907,096 to Timofeev, the disclosure of which is hereby incorporated herein in its entirety. The wiper printed circuit board is typically moved using an electromechanical actuator such as a DC motor that is connected to the wiper printed circuit board via a mechanical linkage. These actuators are often referred to as RET actuators since they are used to apply the remote electronic down tilt.

SUMMARY

Pursuant to embodiments of the present invention, base station antennas are provided that include a RET actuator, a plurality of phase shifters and a plurality of mechanical linkages, where each mechanical linkage is connected between the RET actuator and a respective one or more of the phase shifters. The RET actuator includes a drive element, a rotatable element and a mechanical linkage selection system that is configured to move a selected one of the mechanical linkages into engagement with the drive element. The drive element is configured to move linearly in response to rotation of the rotatable element to move the selected one of the mechanical linkages.

In some embodiments, the drive element comprises a drive block, and the rotatable element comprises a drive wheel. In some of these embodiments, the drive block may include a slot and the drive wheel may include a pin that is received within the slot. In some embodiments, the pin may move reciprocally within the slot in response to rotation of the drive wheel.

In some embodiments, the mechanical linkage selection system may comprise a rotating cam shaft having a plurality of longitudinally and angularly offset cams mounted thereon. In some embodiments, the mechanical linkage selection system may further include a plurality of selection elements, where each selection element is mounted between a respective one of the mechanical linkages and a respective one of the cams, and where each selection element is configured to move a respective one of the mechanical linkages when engaged by a respective one of the cams. In such embodiments, the RET actuator may also include one or more springs that bias the selection elements downwardly.

In some embodiments, the mechanical linkage selection system may comprise a worm gear shaft having an internally-threaded piston mounted thereon and a cam mounted on the internally-threaded piston. In other embodiments, the mechanical linkage selection system may comprise a threaded shaft having an internally-threaded drive nut mounted thereon and a selector mounted on the internally-threaded piston.

In some embodiments, the RET actuator may include a drive motor having a drive shaft that is configured to rotate a worm gear shaft having a worm gear mounted thereon. The RET actuator may be configured so that rotation of the worm gear rotates the drive wheel. In some such embodiments, the mechanical linkage selection system may also include a rotating cam shaft having a cam support mounted thereon, and a plurality of longitudinally and angularly offset cams mounted on the cam support. The drive shaft may also include a gear that is configured to rotate the cam shaft in some embodiments. In these embodiments, the worm gear shaft may include a one-way bearing so that the worm gear only rotates in response to rotation of the drive shaft in a first direction, and where the cam support may include a one-way bearing so that the cam support only rotates in response to rotation of the worm gear shaft in a second direction that is opposite the first direction.

In some embodiments, the mechanical linkage selection system may comprise a rotating cam shaft having a plurality of longitudinally and angularly offset cams mounted thereon, and a stepper motor that is configured to rotate the cam shaft.

In some embodiments, the base station antenna may include a second plurality of phase shifters, and each mechanical linkage may be connected to the RET actuator and a respective one of the phase shifters in the second plurality of phase shifters.

In some embodiments, each mechanical linkage may include a first element that is configured to mate with a corresponding second element on the drive block when the mechanical linkage is selected by the mechanical linkage selection system. Each first element and each second element may comprise, for example, one of a protrusion and an indentation.

In some embodiments, the mechanical linkage selection system may comprise a stepper motor and a threaded shaft (which may or may not be a worm gear shaft) having a selector (such as a cam or other element) mounted thereon.

Pursuant to further embodiments of the present invention, base station antennas are provided that include a RET actuator, a plurality of phase shifters and a plurality of mechanical linkages, where each mechanical linkage is connected between the RET actuator and a respective one or more of the phase shifters. The RET actuator includes a drive system having a drive element and a mechanical linkage selection system that is configured to move a selected one of the mechanical linkages in a first direction to engage the drive element. The drive element is configured to move the selected one of the mechanical linkages in a second direction that is different than the first direction.

In some embodiments, the drive element may be a drive block that mates with the selected one of the mechanical linkages so that movement of the drive block is transferred to the selected one of the mechanical linkages. The drive system may further include a rotatable element, and the drive block may be configured to move in the second direction in response to rotation of the rotatable element. In example embodiments, the drive block may include a slot, and the rotatable element may have a pin that is received within the slot and that is configured to move reciprocally within the slot in response to rotation of the rotatable element.

In some embodiments, the mechanical linkage selection system may further include a plurality of selection elements, where each selection element is mounted below a respective one of the mechanical linkages and configured to move a respective one of the mechanical linkages upwardly. The mechanical linkage selection system may also include at least one cam that is configured to move a selected one of the selection elements upwardly to move the selected one of the mechanical linkages into engagement with the drive element. The mechanical linkage selection system may also include a cam shaft having a cam support mounted thereon, and the at least one cam comprises a plurality of longitudinally and angularly offset cams that are mounted on the cam support. The RET actuator may also include a worm gear shaft having a worm gear mounted thereon that is configured to rotate the rotatable element, and wherein the worm gear shaft includes a gear that is configured to rotate the cam shaft. The worm gear shaft may include a one-way bearing so that the worm gear only rotates in response to rotation of the worm gear shaft in a first direction, and the cam support may likewise include a one-way bearing so that the cam support only rotates in response to rotation of the worm gear shaft in a second direction that is opposite the first direction.

Pursuant to further embodiments of the present invention, base station antennas are provided that include a RET actuator, a plurality of phase shifters and a plurality of mechanical linkages, where each mechanical linkage is connected between the RET actuator and a respective one or more of the phase shifters. The RET actuator includes a rotatable element having a pin extending upwardly therefrom and a block having a slot mounted above the rotatable element. The pin is received within the slot so that rotation of the rotatable element results in linear movement of the block.

In some embodiments, the rotatable element may be a drive wheel and the pin may move reciprocally within the slot in response to rotation of the drive wheel.

In some embodiments, the RET actuator further may include a rotating cam shaft having a plurality of longitudinally and angularly offset cams mounted thereon and a plurality of selection elements, where each selection element is mounted between a respective one of the mechanical linkages and a respective one of the cams and each selection element is configured to move a respective one of the mechanical linkages when engaged by a respective one of the cams.

In other embodiments, the RET actuator may also include a plurality of selection elements and a worm gear shaft having an internally-threaded piston mounted thereon and a cam mounted on the internally-threaded piston, where each selection element is configured to move a respective one of the mechanical linkages when engaged by the cam.

Pursuant to still further embodiments of the present invention, base station antennas are provided that include a RET actuator, a plurality of phase shifters and a plurality of mechanical linkages, where each mechanical linkage is connected between the RET actuator and a respective one or more of the phase shifters. The RET actuator includes a drive system having a drive block that is configured to move along an axis, the drive block including a plurality of channels that receive respective ones of the mechanical linkages and a mechanical linkage selection system that is configured to move a selected one of the mechanical linkages into engagement with the drive block so that movement of the drive block is transferred to the selected one of the mechanical linkages.

Pursuant to still further embodiments of the present invention, methods of adjusting a phase shifter are provided in which a motor is rotated in a first direction to drive a mechanical linkage selection system to move a selected one of a plurality of mechanical linkages into engagement with a drive system and the motor is rotated in a second direction that is opposite the first direction to move the selected one of the mechanical linkages.

In some embodiments, rotating the motor in a second direction that is opposite the first direction to move the selected one of the mechanical linkages comprises rotating the motor in the second direction to rotate a rotatable element having a pin mounted thereon and providing a drive block that is mounted for movement along an axis above the rotatable element, the drive block including a slot in a lower surface thereof and the pin received within the slot so that rotation of the rotatable element results in movement of the drive block.

In some embodiments, rotating a motor in a first direction to drive a selection system to move a selected one of a plurality of mechanical linkages into engagement with a drive system comprises rotating the motor in the first direction to rotate a cam shaft having a plurality of longitudinally and angularly offset cams mounted thereon and halting rotation of the motor when a selected one of the cams engages a selection element that is disposed between the selected one of the cams and a selected one of the mechanical linkages, wherein the selected one of the cams pushes the selection element and the cams engages a selection element that is disposed between the selected one of the cams and a selected one of the mechanical linkages upwardly so that the selected one of the mechanical linkages engages the drive block.

DETAILED DESCRIPTION

Figure 1A:
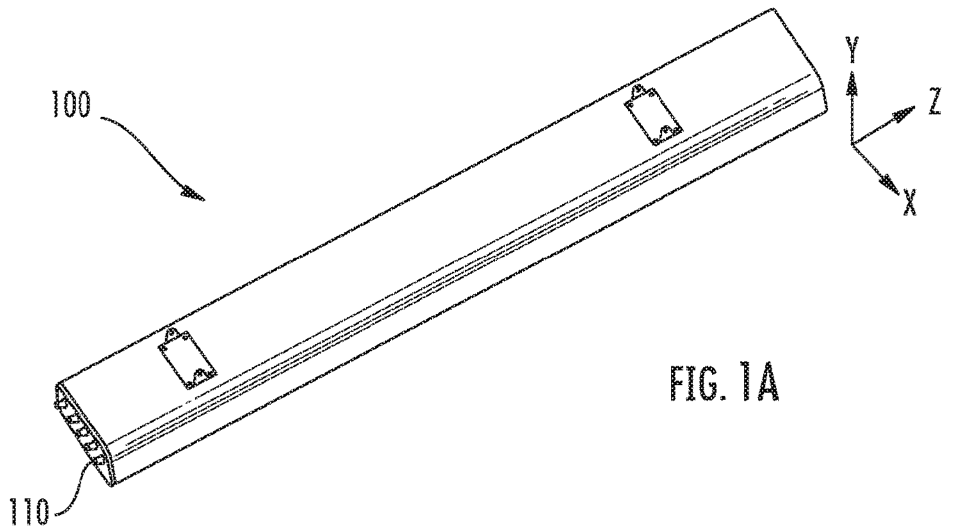
FIG. 1A is a perspective view of an example base station antenna according to embodiments of the present invention.

Modern base station antennas often include two, three or more linear arrays of radiating elements. If the linear arrays include cross-polarized radiating elements, then a separate phase shifter is provided for each polarization (i.e., two phase shifters per linear array). Moreover, separate transmit and receive phase shifters are often provided for each linear array so that the transmit and receive radiation patterns may be independently adjusted, which may again double the number of phase shifters. Additionally, in some cases, some (or all) of the linear arrays may be formed using wideband radiating elements that support service in multiple frequency bands (e.g., the 700 MHz and 800 MHz frequency bands or two or more frequency bands within the 1.7-2.7 GHz frequency range). When such wideband linear arrays are used, separate phase shifters may be provided for each frequency band within the broader operating frequency range of the radiating elements. Since base station antennas with two to as many as eight linear arrays of cross-polarized radiating elements are being deployed, it is not uncommon for a base station antenna to have eight, twelve or even twenty-four adjustable phase shifters for applying remote electronic down tilts to the linear arrays. As described above, RET actuators are provided in the antenna that are used to move elements on the phase shifters to adjust the down tilt angle of the antenna beams formed by the various linear arrays. While the same down tilt is typically applied to the phase shifters for the two different polarizations, allowing a single RET actuator and a single mechanical linkage to be used to adjust the phase shifters for both polarizations, modern base station antennas still often need four, six, twelve or even more RET actuators. Such large numbers of RET actuators and associated mechanical linkages can significantly increase the size, weight and cost of a base station antenna.

Conventionally, a separate RET actuator was provided for each phase shifter (or each pair of phase shifters if dual polarized radiating elements are used in a linear array). More recently, RET actuators have been proposed that may be used to move the wiper printed circuit board on as many as twelve phase shifters. For example, U.S. Patent Publication No. 2013/0307728 ("the '728 publication") discloses a RET actuator that may be used to drive six different mechanical linkages for purposes of adjusting six (or twelve) different phase shifters using one so-called "multi-RET actuator." U.S. Patent Publication No. 201/0365923 ("the '923 publication") discloses a number of additional multi-RET actuator designs.

As more complex base station antennas are introduced, requiring ever increasing numbers of independently controlled phase shifters, it can become difficult to design base station antennas that fit within customer-demanded limitations on the size of the antenna. While conventional multi-RET actuators occupy less volume within the antenna than the total volume occupied by the individual RET actuators that they replace, conventional multi-RET actuators tend to be large and cumbersome, and hence may be difficult to fit within some antenna designs. It can also be difficult to accommodate multiple multi-RET actuators within base station antenna designs, which is sometimes required.

Pursuant to embodiments of the present invention, base station antennas are provided that include multi-RET actuators having a much smaller physical footprint. In some embodiments, the multi-RET actuators may include two motors while, in other embodiments, the multi-RET actuators may each only require a single motor. The multi-RET actuators according to embodiments of the present invention may have expandable designs so that the same motor(s) and gearing mechanism(s) may be used to control any number of mechanical linkages up to some maximum number, such as, for example, twelve mechanical linkages.

The base station antennas pursuant to some embodiments of the present invention may include, among other things, a multi-RET actuator, a plurality of phase shifters and a plurality of mechanical linkages, where each mechanical linkage is connected between the multi-RET actuator and a respective one of the phase shifters. The multi-RET actuator may comprise a drive element, a rotatable element and a mechanical linkage selection system that is configured to move a selected one of the mechanical linkages into engagement with the drive element. The drive element is configured to move linearly in response to rotation of the rotatable element to move the selected one of the mechanical linkages.

In some embodiments, the drive element may comprise a drive block that may be mounted on rails, in a channel or in some other fashion so that the drive block may move linearly along an axis. The rotatable element may comprise a circular drive wheel or other shaped member that rotates about an axis. In some embodiments, the drive block includes a slot, and the drive wheel includes a pin that is received within the slot so that the pin may move reciprocally within the slot in response to rotation of the drive wheel, causing the drive block to move forwardly and rearwardly along the axis. Since a selected one of the mechanical linkages may be engaged with the drive block, the forward and/or rearward movement of the drive block may be transferred to the selected mechanical linkage, and the amount of movement may be controlled so that the selected mechanical linkage moves a moveable element of a phase shifter (e.g., a wiper arc printed circuit board) a pre-selected distance in order to adjust, for example, the downtilt on a selected one of the linear arrays of the base station antenna.

In some embodiments, the mechanical linkage selection system may include a rotating cam shaft that has a cam support mounted thereon. A plurality of longitudinally and angularly offset cams are mounted on the cam support. The mechanical linkage selection system may further include a plurality of selection elements. Each selection element may be mounted below a respective one of the mechanical linkages and above a respective one of the cams (or other elements or "selectors" that are designed to engage one or more of the selection elements), and each selection element may be configured to move upwardly when engaged by a respective one of the cams. As a given one of the selection elements is moved upwardly, it may move its associated mechanical linkage upwardly so that the mechanical linkage engages the drive element.

The above-described multi-RET actuator may also include a drive motor having a drive shaft. The drive shaft may be configured to rotate a worm gear shaft that has an internally threaded worm gear mounted thereon so that the threads of the worm gear are mated with teeth that are provided on the drive wheel. In such embodiments, the worm gear shaft may include a one-way bearing so that the worm gear (and hence the drive wheel) only rotates in response to rotation of the worm gear shaft in a first direction, and the worm gear shaft may also be configured to rotate the cam shaft when the worm gear shaft rotates in a second direction. The cam support may likewise include a one-way bearing so that the cam support only rotates in response to rotation of the cam shaft in one direction. In other embodiments, the multi-RET actuator may further include a stepper motor. In such embodiments, the drive motor may be configured to rotate the drive wheel and the stepper motor may be configured to rotate the cam shaft, and the one-way bearings and various gears may be omitted.

In other embodiments, base station antennas are provided that include multi-RET actuators that include a drive system having a drive element and a mechanical linkage selection system that is configured to move a selected one of the mechanical linkages in a first direction to engage the drive element, and the drive element is configured to move the selected one of the mechanical linkages in a second direction that is different from the first direction. For example, the selection system may move the selected one of the mechanical linkages vertically so that the selected one of the mechanical linkages engages the drive element, and then the drive element may be moved longitudinally to move the selected one of the mechanical linkages longitudinally. The longitudinal movement of the selected one of the mechanical linkages may adjust a setting of one or more phase shifters of the base station antenna.

In still other embodiments, base station antennas are provided that include multi-RET actuators that include a rotatable element such as a drive wheel that has a pin extending upwardly therefrom and a sliding block having a slot mounted above the rotatable element, where the pin is received within the slot so that rotation of the rotatable element results in linear movement of the block. A selected one of a plurality of mechanical linkages may be engaged with the block so that the linear movement of the block is transferred to the selected one of the mechanical linkages.

Pursuant to further embodiments of the present invention, base station antennas are provided that include multi-RET actuators that include a drive system having a drive block that is configured to move along an axis, the drive block including a plurality of channels that receive respective ones of the mechanical linkages. The multi-RET actuators further include a mechanical linkage selection system that is configured to move a selected one of the mechanical linkages into engagement with the drive block so that movement of the drive block is transferred to the selected one of the mechanical linkages.

Pursuant to still further embodiments of the present invention, methods of adjusting a phase shifter of a base station antenna are provided in which a motor is rotated in a first direction to drive a mechanical linkage selection system to move a selected one of a plurality of mechanical linkages into engagement with a drive system. The motor is then rotated in a second direction that is opposite the first direction to move the selected one of the mechanical linkages.

Embodiments of the present invention will now be discussed in greater detail with reference to the drawings.

Figure 1B:
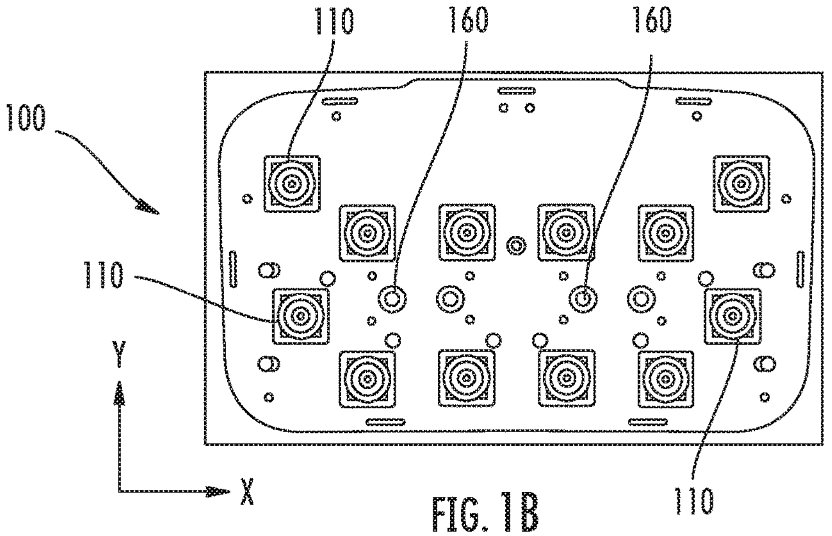
FIG. 1B is an end view of the base station antenna of FIG. 1A.
Figure 1C:
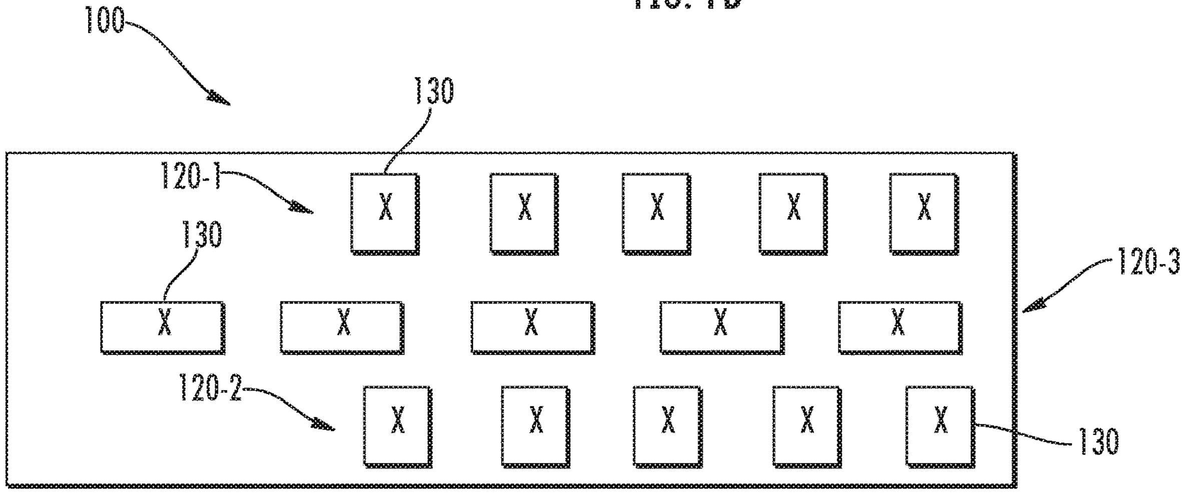
FIG. 1C is a schematic plan view of the base station antenna of FIG. 1A that illustrates the three linear arrays of radiating elements thereof.
Figure 2:
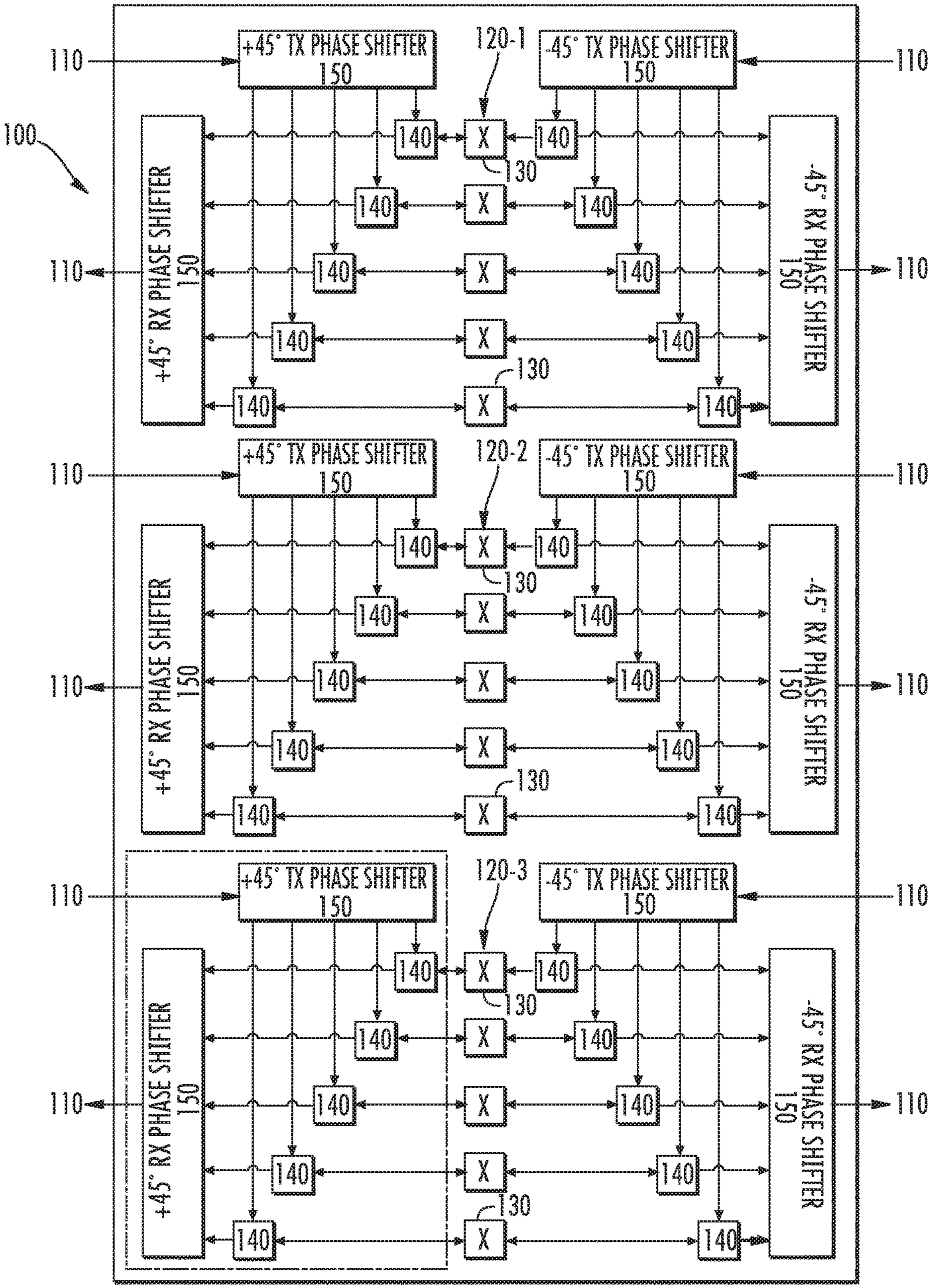
FIG. 2 is a schematic block diagram illustrating the electrical connections between various of the components of the base station antenna of FIGS. 1A-1C.

FIG. 1A is a perspective view of a base station antenna 100 that may include one or more of the multi-RET actuators according to embodiments of the present invention. FIG. 1B is an end view of the base station antenna 100 that illustrates the input/output ports thereof. FIG. 1C is a schematic plan view of the base station antenna 100 that illustrates the three linear arrays of radiating elements thereof. FIG. 2 is a schematic block diagram illustrating various components of the base station antenna 100 and the electrical connections therebetween. It should be noted that FIG. 2 does not show the actual location of the various elements on the antenna, but instead is drawn to merely show the electrical transmission paths between the various elements.

Referring to FIGS. 1A-1C and 2, the base station antenna 100 includes, among other things, input/output ports 110, a plurality of linear arrays 120 of radiating elements 130, duplexers 140, phase shifters 150 and control ports 160. As shown in FIGS. 1C and 2, the base station antenna 100 includes a total of three linear arrays 120 (labeled 120-1 through 120-3) that each include five radiating elements 130. It will be appreciated, however, that the number of linear arrays 120 and the number of radiating elements 130 included in each of the linear arrays 120 may be varied. It will also be appreciated that different linear arrays 120 may have different numbers of radiating elements 130.

Referring to FIG. 2, the connections between the input/output ports 110, radiating elements 130, duplexers 140 and phase shifters 150 are schematically illustrated. Each set of an input port 110 and a corresponding output port 110, and their associated phase shifters 150 and duplexers 140, may comprise a corporate feed network. A dashed box is used in FIG. 2 to illustrate one of the six corporate feed networks included in antenna 100. Each corporate feed network connects the radiating elements 130 of one of the linear arrays 120 to a respective pair of input/output ports 110.

As shown schematically in FIG. 2 by the "X" that is included in each box, the radiating elements 130 may be cross-polarized radiating elements 130 such as +45°/−45° slant dipoles that may transmit and receive RF signals at two orthogonal polarizations. Any other appropriate radiating element 130 may be used including, for example, single dipole radiating elements or patch radiating elements (including cross-polarized patch radiating elements). When cross-polarized radiating elements 130 are used, two corporate feed networks may be provided per linear array 120, a first of which carries RF signals having the first polarization (e.g., +45°) between the radiating elements 130 and a first pair of input/output ports 110 and the second of which carries RF signals having the second polarization (e.g., −45°) between the radiating elements 130 and a second pair of input/output ports 110, as shown in FIG. 2.

As shown in FIG. 2, an input of each transmit ("TX") phase shifter 150 may be connected to a respective one of the input ports 110. Each input port 110 may be connected to the transmit port of a radio (not shown) such as a remote radio head. Each transmit phase shifter 150 has five outputs that are connected to respective ones of the radiating elements 130 through respective duplexers 140. The transmit phase shifters 150 may divide an RF signal that is input thereto into a plurality of sub-components and may effect a phase taper to the sub-components of the RF signal that are provided to the radiating elements 130. In a typical implementation, a linear phase taper may be applied to the radiating elements 130. As an example, the first radiating element 130 in a linear array 120 may have a phase of Y°+2X°, the second radiating element 130 in the linear array 120 may have a phase of Y°+X°, the third radiating element 130 in the linear array 120 may have a phase of Y°, the fourth radiating element 130 in the linear array 120 may have a phase of Y°-X°, and the fifth radiating element 130 in the linear array 120 may have a phase of Y°-2X°, where the radiating elements 130 are arranged in numerical order.

Similarly, each receive ("RX") phase shifter 150 may have five inputs that are connected to respective ones of the radiating elements 130 through respective duplexers 140 and an output that is connected to one of the output ports 110. The output port 110 may be connected to the receive port of a radio (not shown). The receive phase shifters 150 may effect a phase taper to the RF signals that are received at the five radiating elements 130 of the linear array 120 and may then combine those RF signals into a composite received RF signal. Typically, a linear phase taper may be applied to the radiating elements 130 as is discussed above with respect to the transmit phase shifters 150.

The duplexers 140 may be used to couple each radiating element 130 to both a transmit phase shifter 150 and to a receive phase shifter 150. As is well known to those of skill in the art, a duplexer is a three port device that (1) passes signals in a first frequency band (e.g., the transmit band) through a first port while not passing signals in a second band (e.g., a receive band), (2) passes signals in the second frequency band while not passing signals in the first frequency band through a second port thereof and (3) passes signals in both the first and second frequency bands through the third port thereof, which is often referred to as the "common" port.

As can be seen from FIG. 2, the base station antenna 100 may include a total of twelve phase shifters 150. While the two transmit phase shifters 150 for each linear array 120 (i.e., one transmit phase shifter 150 for each polarization) may not need to be controlled independently (and the same is true with respect to the two receive phase shifters 150 for each linear array 120), there still are six sets of two phase shifters 150 that should be independently controllable.

The RET actuators that are used to physically adjust the settings of the phase shifters 150 are typically spaced apart from the phase shifters 150. So-called mechanical linkages are used to transfer the motion of a RET actuator to a moveable element of a phase shifter. Each RET actuator may be controlled to generate a desired amount of movement of an output member thereof. The movement may comprise, for example, linear movement or rotational movement. A mechanical linkage is used to translate the movement of the output member of the RET actuator to movement of a moveable element of a phase shifter 150 (e.g., a wiper arm, a sliding dielectric member, etc.). The mechanical linkage may comprise, for example, one or more plastic or fiberglass rods that extend between the output member of the RET actuator and the moveable element of the phase shifter 150.

Each phase shifter 150 shown in FIG. 2 may be implemented, for example, as a rotating wiper phase shifter. The phase shifts imparted by a phase shifter 150 to each subcomponent of an RF signal may be controlled by a mechanical positioning system that physically changes the position of the rotating wiper of each phase shifter 150, as will be explained with reference to FIG. 3.

Figure 3:
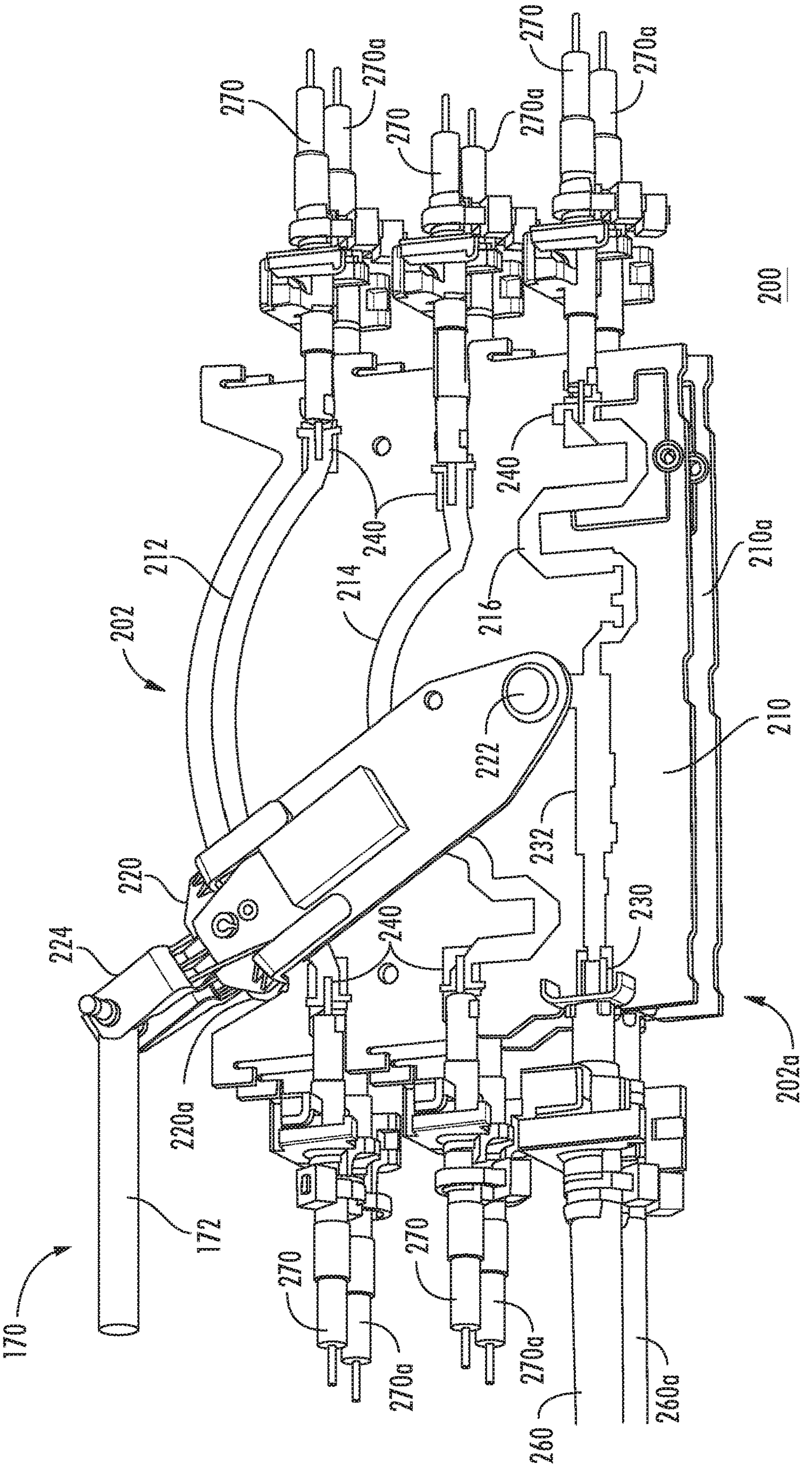
FIG. 3 is a front perspective view of a pair of electromechanical phase shifters that may be included in the base station antenna of FIGS. 1A-1C.

Referring to FIG. 3, a dual rotating wiper phase shifter assembly 200 is illustrated that may be used to implement, for example, two of the phase shifters 150 of FIG. 2 (one for each of the two polarizations). The dual rotating wiper phase shifter assembly 200 includes first and second phase shifters 202, 202*a*. In the description of FIG. 3 that follows it is assumed that the two phase shifters 202, 202*a* are each transmit phase shifters that have one input and five outputs. It will be appreciated that if the phase shifters 202, 202*a* are instead used as receive phase shifters then the terminology changes, because when used as receive phase shifters there will be five inputs and a single output.

As shown in FIG. 3, the dual phase shifter 200 includes first and second main (stationary) printed circuit boards 210, 210*a* that are arranged back-to-back as well as first and second rotatable wiper printed circuit boards 220, 220*a* (wiper printed circuit board 220*a* is barely visible in the view of FIG. 3) that are rotatably mounted on the respective main printed circuit boards 210, 210*a*. The wiper printed circuit boards 220, 220*a* may be pivotally mounted on the respective main printed circuit boards 210, 210*a* via a pivot pin 222. The wiper printed circuit boards 220, 220*a* may be joined together at their distal ends via a bracket 224.

The position of each rotatable wiper printed circuit boards 220, 220*a* above its respective main printed circuit board 210, 210*a* is controlled by the position of a mechanical linkage 170 (partially shown in FIG. 3) that extends between an output member of a RET actuator and the phase shifter 200.

Each main printed circuit board 210, 210*a* includes transmission line traces 212, 214. The transmission line traces 212, 214 are generally arcuate. In some cases the arcuate transmission line traces 212, 214 may be disposed in a serpentine pattern to achieve a longer effective length. In the example illustrated in FIG. 3, there are two arcuate transmission line traces 212, 214 per main printed circuit board 210, 210*a* (the traces on printed circuit board 210*a* are not visible in FIG. 3), with the first arcuate transmission line trace 212 being disposed along an outer circumference of each printed circuit board 210, 210*a*, and the second arcuate transmission line trace 214 being disposed on a shorter radius concentrically within the outer transmission line trace 212. A third transmission line trace 216 on each main printed circuit board 210, 210*a* connects an input pad 230 on each main printed circuit board 210, 210*a* to an output pad 240 that is not subjected to an adjustable phase shift.

The main printed circuit board 210 includes one or more input traces 232 leading from the input pad 230 near an edge of the main printed circuit board 210 to the position where the pivot pin 222 is located. RF signals on the input trace 232 are coupled to a transmission line trace (not visible in FIG. 3) on the wiper printed circuit board 220, typically via a capacitive connection. The transmission line trace on the wiper printed circuit board 220 may split into two secondary transmission line traces (not shown). The RF signals are capacitively coupled from the secondary transmission line traces on the wiper printed circuit board 220 to the transmission line traces 212, 214 on the main printed circuit board. Each end of each transmission line trace 212, 214 may be coupled to a respective output pad 240. A coaxial cable 260 or other RF transmission line component may be connected to input pad 230. A respective coaxial cable 270 or other RF transmission line component may be connected to each respective output pad 240. As the wiper printed circuit board 220 moves, an electrical path length from the input pad 230 of phase shifter 202 to each radiating element 130 served by the transmission lines 212, 214 changes. For example, as the wiper printed circuit board 220 moves to the left it shortens the electrical length of the path from the input pad 230 to the output pad 240 connected to the left side of transmission line trace 212 (which connects to a first radiating element 130), while the electrical length from the input pad 230 to the output pad 240 connected to the right side of transmission line trace 212 (which connects to a second radiating element) increases by a corresponding amount. These changes in path lengths result in phase shifts to the signals received at the output pads 240 connected to transmission line trace 212 relative to, for example, the output pad 240 connected to transmission line trace 216.

The second phase shifter 202*a* may be identical to the first phase shifter 202. As shown in FIG. 3, the rotating wiper printed circuit board 220*a* of phase shifter 202*a* may be controlled by the same drive shaft 170 as the rotating wiper printed circuit board 220 of phase shifter 202. For example, if a linear array 120 includes dual polarized radiating elements 130, typically the same phase shift will be applied to the RF signals transmitted at each of the two orthogonal polarizations. In this case, a single mechanical linkage 170 may be used to control the positions of the wiper printed circuit boards 220, 220*a* on both phase shifters 202, 202*a*.

Figure 4A:
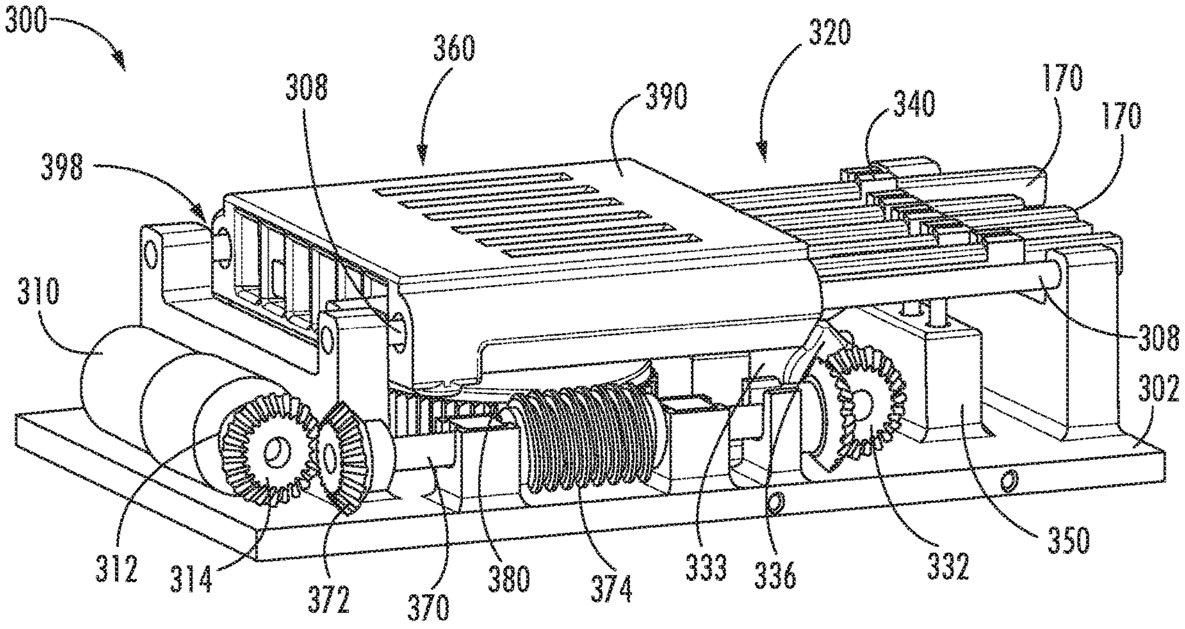
FIG. 4A is perspective view of a multi-RET actuator that may be used in base station antennas according to embodiments of the invention.
Figure 4B:
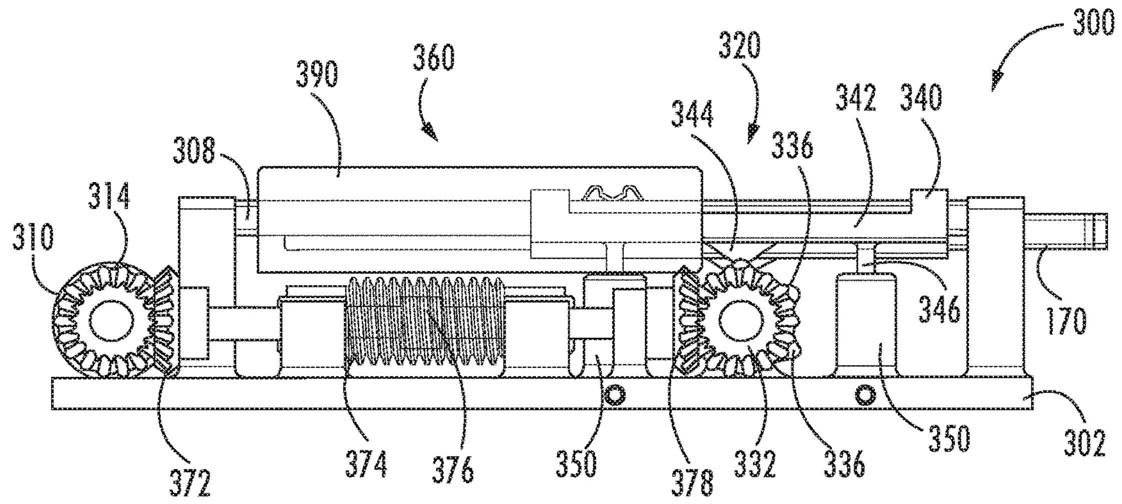
FIG. 4B is a side view of the multi-RET actuator of FIG. 4A.
Figure 4C:
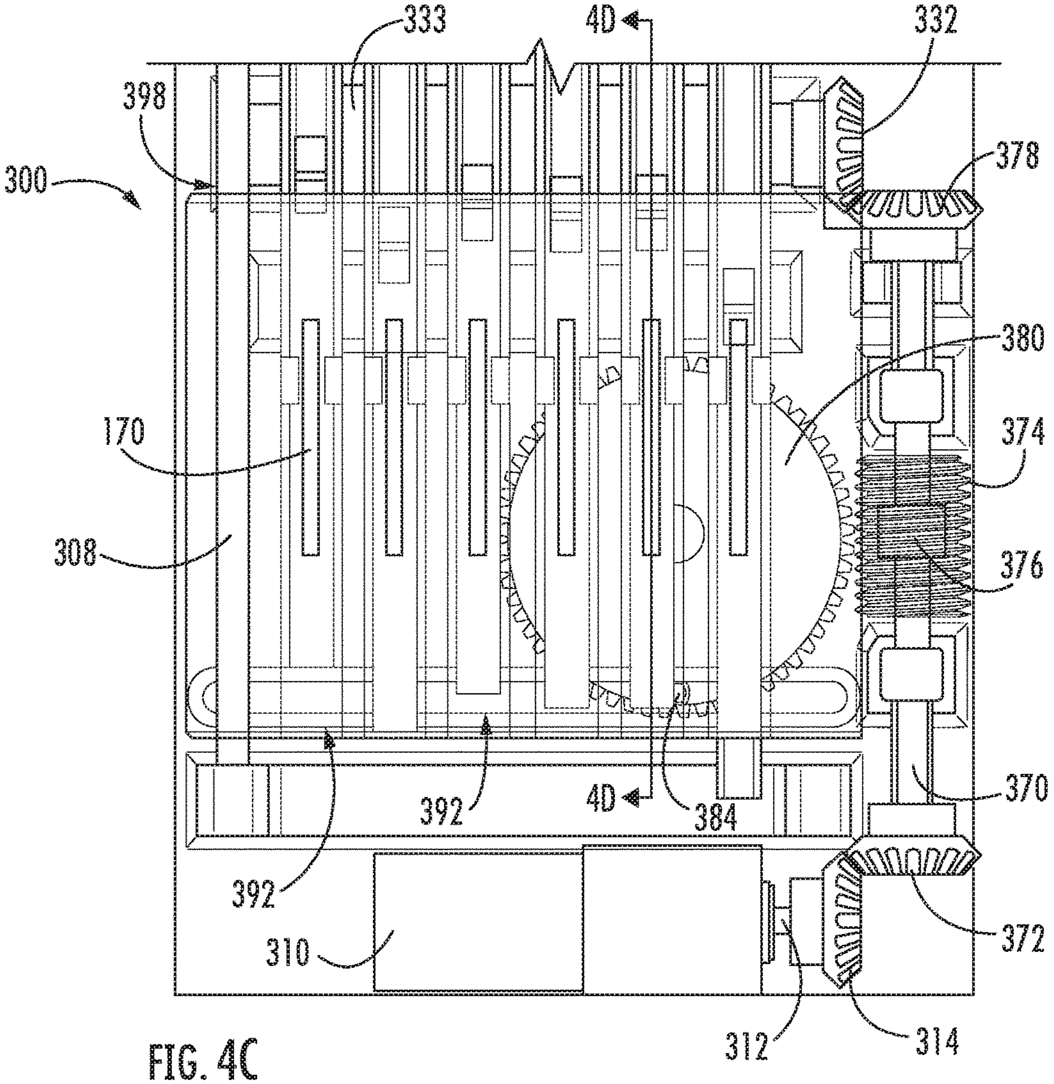
FIG. 4C is a top view of the multi-RET actuator of FIG. 4A.
Figure 4D:
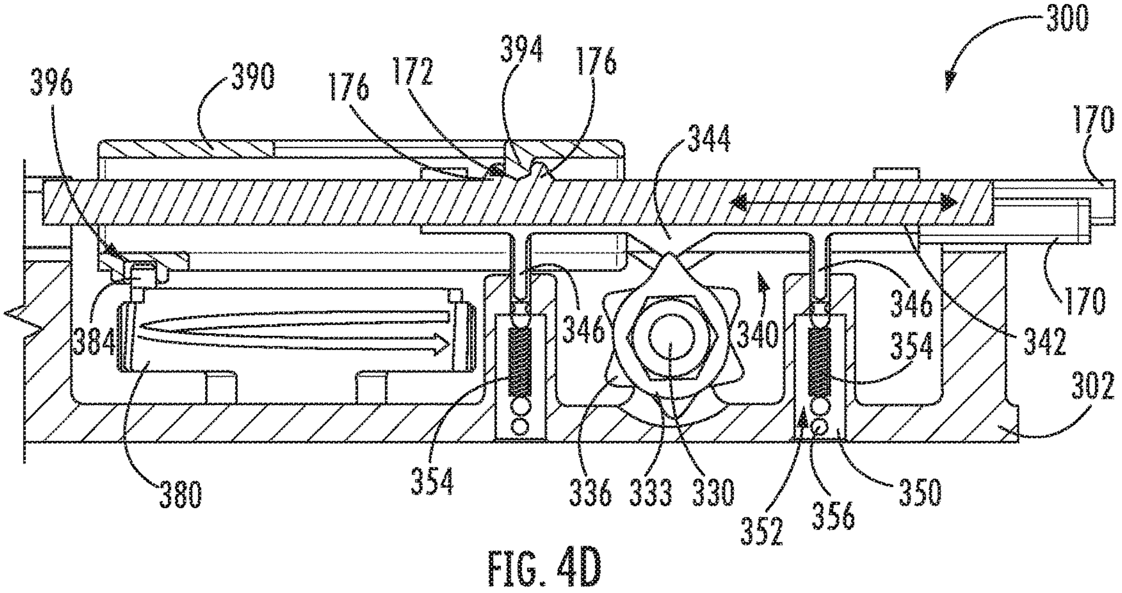
FIG. 4D is a cross-sectional view of the multi-RET actuator of FIGS. 4A-4C taken along line 4D-4D of FIG. 4C.
Figure 4E:
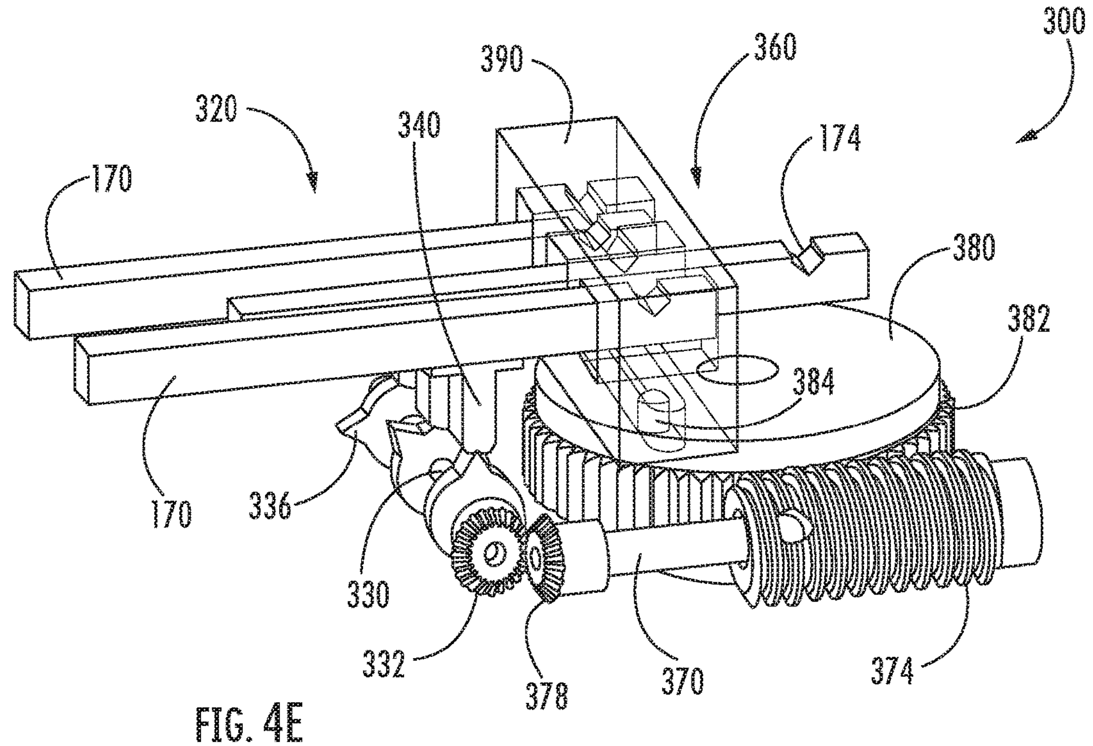
FIG. 4E is a partial perspective view of selected components of the multi-RET actuator of FIG. 4A omitted to more clearly highlight the operation thereof.

FIGS. 4A-4D illustrate a multi-RET actuator 300 that may be included in base station antennas according to embodiments of the present invention such as base station antenna 100. In particular, FIG. 4A is perspective view of the multi-RET actuator 300, FIG. 4B is a side view of the multi-RET actuator 300, FIG. 4C is a shadow top view of the multi-RET actuator 300 and FIG. 4D is a cross-sectional view of the multi-RET actuator 300. FIGS. 4E-4H are perspective, side, top and cross-sectional views, respectively, of the multi-RET actuator 300 with various of the components omitted to more clearly highlight the operation thereof. In FIGS. 4E-4H a mirror image version of the multi-RET actuator 300 is shown which helps provide a more complete view of the design of the multi-RET actuator 300.

Referring to FIGS. 4A-4H, the multi-RET actuator 300 includes a base plate 302, a drive motor 310, a mechanical linkage selection system 320 and a drive system 360. The multi-RET actuator 300 may further include a controller (not shown) that controls operation of the drive motor 310 in response to, for example, control signals received from a remote location.

The drive motor 310 may comprise a direct current ("DC") motor. The drive motor 310 includes a drive shaft 312. In the depicted embodiment, the drive shaft 312 includes a bevel gear 314 at a distal end thereof.

A worm gear shaft 370 is arranged at a right angle to the drive shaft 312. The worm gear shaft 370 includes a first bevel gear 372 on an end thereof that is adjacent the drive shaft 312 and includes a second bevel gear 378 on an opposite end thereof. The first bevel gear 372 engages the bevel gear 314 on drive shaft 312 so that rotation of the drive shaft 312 in a first direction (e.g., clockwise) results in rotation of the worm gear shaft 370 in a second direction (e.g., counter-clockwise), and vice versa. The worm gear shaft 370 includes a worm gear 374 mounted thereon. A one-way bearing 376 (see FIGS. 4C and 4F) between the worm gear shaft 370 and the worm gear 374 prevents the worm gear 374 from rotating when the worm gear shaft 370 rotates in a first direction (e.g., clockwise) while allowing the worm gear 374 to rotate when the worm gear shaft 370 rotates in a second direction that is opposite the first direction (e.g., counter-clockwise).

The mechanical linkage selection system 320 includes a rotating cam shaft 330 that is disposed at a right angle to the worm gear shaft 370. A cam support 333 is mounted on the cam shaft 330. The cam shaft 330 has a bevel gear 332 on the end thereof that is adjacent the worm gear shaft 370. The bevel gear 332 on the cam shaft 330 engages the bevel gear 378 on the worm gear shaft 370 so that rotation of the worm gear shaft 370 in the first direction (e.g., clockwise) results in rotation of the cam shaft 330 in a second direction that is opposite the first direction (e.g., counter-clockwise). A one-way bearing 334 on the cam shaft 330 only allows the cam support 333 to rotate in response to rotation of the cam shaft 330 in one direction (e.g., counter-clockwise). Thus, for example, rotation of the worm gear shaft 370 in the clockwise direction results in rotation of the cam support 333 and no rotation of the worm gear 374, while rotation of the worm gear shaft 370 in the opposite direction (e.g., counter-clockwise) results in rotation of the worm gear 374 and no rotation of the cam support 333. It will be appreciated that the directions of rotations may be reversed or otherwise changed by using different configurations or gearing arrangements.

A plurality of cams 336 (or other elements that are designed to engage one or more of the below-described selection elements) are mounted on the cam support 333. The cams 336 are longitudinally spaced apart from each other along the cam shaft 330, and are also rotationally offset from each other. Due to this rotational offset, the cams 336 are arranged so that only one cam 336 will point directly upwardly at any given time.

The mechanical linkage selection system 320 further includes a plurality of selection elements 340. Each selection element 340 may be implemented as a bar-shaped element 342 that includes a downwardly-extending nub 344 and a pair of downwardly extending arms 346. Each selection element 340 may be disposed underneath a respective one of the mechanical linkages 170. Each selection element 340 may be disposed above a respective one of the cams 336 so that each cam 336 is associated with a respective one of the selection elements 340 which in turn is associated with a respective one of the mechanical linkages 170. As discussed below, as the cam shaft 330 rotates, each cam 336 will in turn contact the nub 344 on its associated selection element 340 and push the selection element 340 upwardly, which in turn pushes the associated mechanical linkage 170 upwardly.

As shown best in FIG. 4D, a pair of spring blocks 350 are mounted on the base 302. Each spring block 350 includes a plurality of spring cavities 352 (only one spring cavity 352 per spring block 350 is visible in FIG. 4D) that are positioned underneath a respective one of the mechanical linkages 170. A spring 354 is disposed within each spring cavity 352. A bottom end of each spring 354 may be connected to an attachment point 356 within the bottom of each respective spring cavity 352, and a top end of each spring 354 may be connected to a respective one of the arms 346. The springs 354 may bias each selection element 340 downwardly, with two springs 354 provided for each selection element 340 in the depicted embodiment. The springs 354 may facilitate returning a one of the selection elements 340 that is pushed upwardly back into its (lower) resting position once the cam 336 associated with the selection element 340 is rotated out of contact with the selection element 340. In other example embodiments, a single spring cavity 352 may be provided per spring block 350.

The drive system 360 includes the above-described drive motor 310, worm gear shaft 370, worm gear 374, a rotatable element such as a drive wheel 380 and a drive element such as, for example, a drive block 390. As shown best in FIGS. 4A, 4C and 4E, the drive wheel 380 may comprise a circular gear having teeth 382 and may be mounted to be in contact with the worm gear 374. The teeth 382 may mate with the threads of the worm gear 374 so that rotation of the worm gear 374 in a second direction (e.g., the counter-clockwise direction) about the worm gear shaft 370 causes the drive wheel 380 to rotate in the counter-clockwise direction. The drive wheel 380 includes a pin 384 that extends upwardly from an upper surface thereof. The pin 384 may be located near the outer diameter of the drive wheel 380.

Figure 4F:
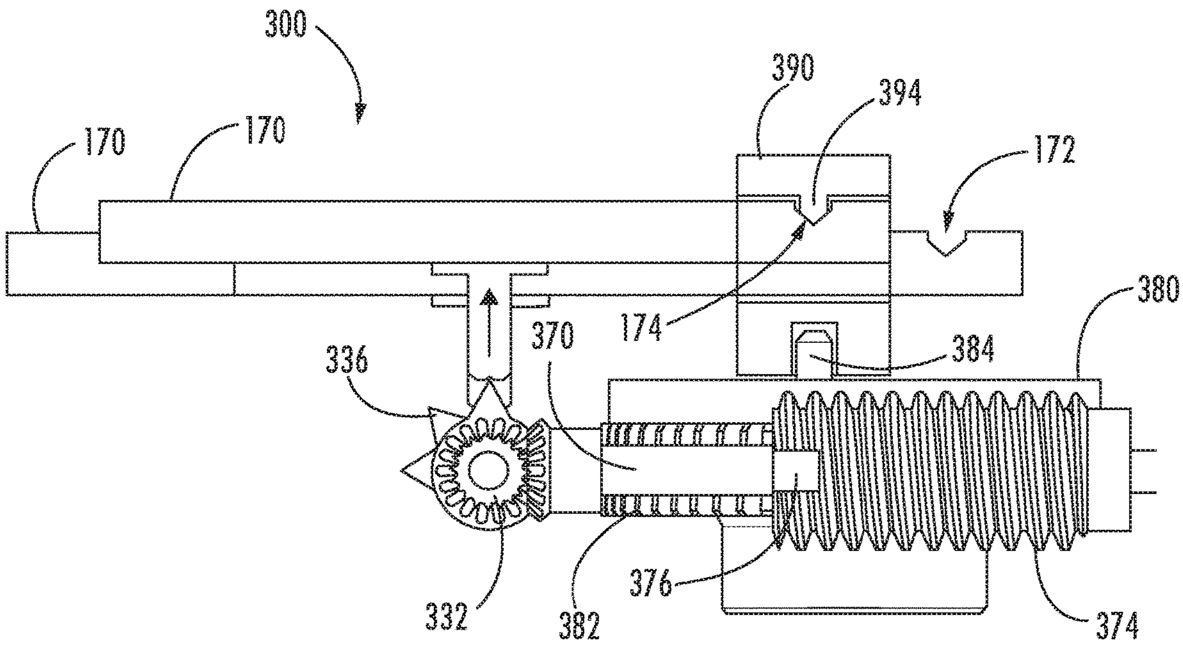
FIG. 4F is a side view of the partial perspective view of FIG. 4E.
Figure 4G:
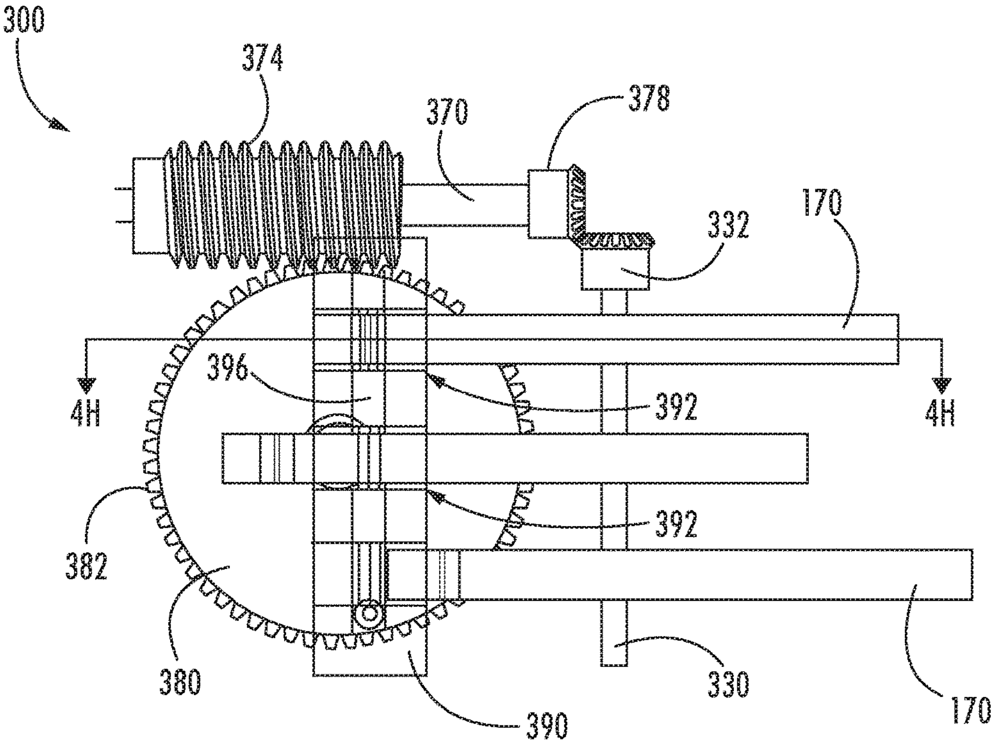
FIG. 4G is a top view of the partial perspective view of FIG. 4E.
Figure 4H:
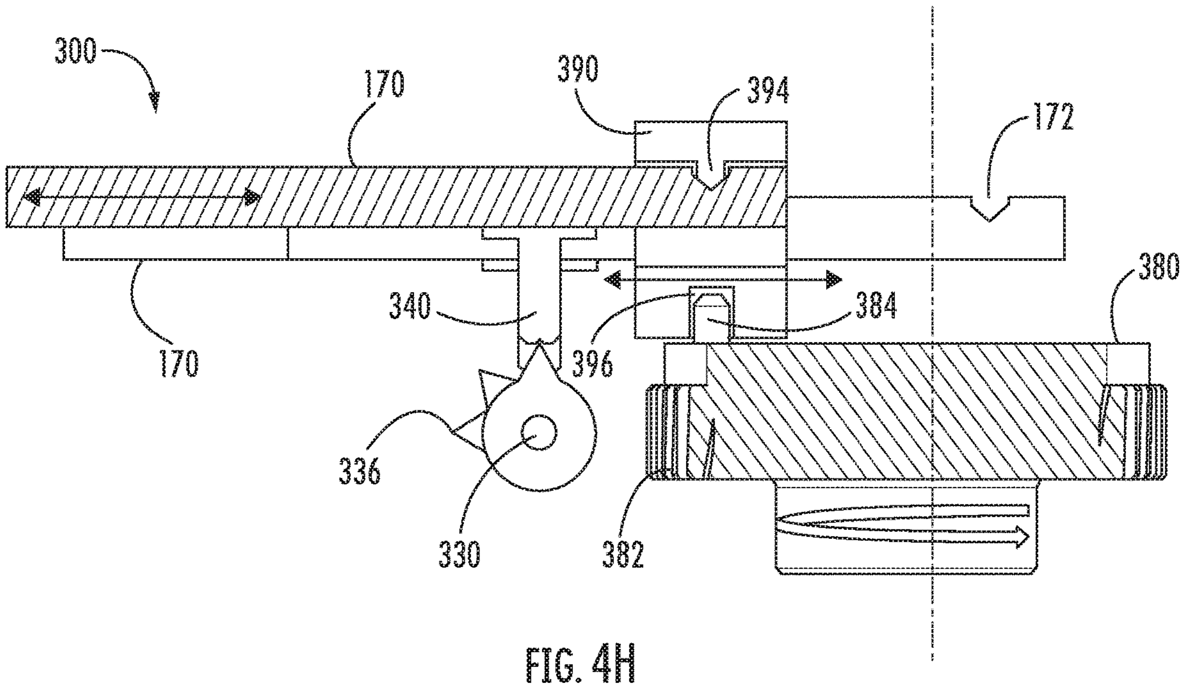
FIG. 4H is a cross-sectional view of the of the partial multi-RET actuator of FIGS. 4E-4G taken along line 4H-4H of FIG. 4G.

The drive block 390 is mounted above the drive wheel 380. The drive block 390 includes a plurality of internal channels 392. Individual channels 392 may be provided for each mechanical linkage or one or more larger cavities may be provided that act as a series of channels 392 for receiving the mechanical linkages 170. An end of a respective mechanical linkage 170 is received within each respective channel 392. As best shown in FIGS. 4F and 4H, the top surface of each internal channel 392 includes a downwardly-extending protrusion 394. Each mechanical linkage 170 includes an indentation such as a slot 172 in an upper surface thereof. As will be explained in detail below, when a mechanical linkage 170 is "selected" by the mechanical linkage selection system 320 (in the present embodiment a mechanical linkage 170 is selected when it is pushed upwardly), the protrusion 394 in the drive block 390 that corresponds to the selected mechanical linkage 170 may be received within the slot 172 in the mechanical linkage 170, so that longitudinal movement of the drive block 390 may be transferred to the selected one of the mechanical linkages 170.

Referring to FIGS. 4A and 4C, the drive block 390 further includes a slot 396 that is formed in a lower surface thereof underneath the internal channels 392, and a pair of cylindrical cavities 398 that have respective rails 308 extending therethrough. The drive block 390 is configured so that it may move forwardly or rearwardly on the rails 308. The pin 384 of the drive wheel 380 is received within the slot 396. As the pin 384 rotates when the drive wheel 380 is rotated, the pin 384 pushes against the walls that define the slot 396 and hence pushes the drive block 390 either forwardly or rearwardly as shown by the double-sided arrow in FIG. 4H. Counter-clockwise rotation of the drive wheel 380 from the point shown in FIG. 4H results in the drive block 390 moving rearwardly until the drive wheel 380 has turned through an angle of 180 degrees, at which point further rotation of the drive wheel 380 results in the drive block 390 moving forwardly until the drive wheel 380 has rotated through a full 360 degrees of rotation. The pin 384 moves in one direction within the slot 396 as the drive wheel 380 rotates counter-clockwise from 90 degrees through 270 degrees, and then moves in the opposite direction within the slot 396 as the drive wheel 380 rotates in the counter-clockwise direction from 270 degrees to 90 degrees. Thus, the pin 384 moves reciprocally within the slot 396.

Operation of a base station antenna that includes the multi-RET actuator 300 will now be described in detail with reference to FIGS. 4A-4H.

A command may be received indicating that a change to a position of a moveable element (e.g., a wiper arm) of a phase shifter 150 of a base station antenna 100 that includes the multi-RET actuator 300 is required in order to, for example, adjust the downtilt angle on a phased array 120 of the base station antenna 100. The moveable element of the phase shifter 150 may be adjusted by moving a mechanical linkage 170 that extends between the multi-RET actuator 300 and the phase shifter 150 that is to be adjusted. In some embodiments, upon receiving the command to change the setting of the phase shifter 150, the multi-RET actuator 300 may first be controlled to pre-position the drive block 390 so that the protrusion 394 in the channel 392 that holds the mechanical linkage 170 that is to be moved is directly above the notch 172 in the upper surface of the mechanical linkage 170.

The pre-positioning of the drive block 390 may be accomplished by programming the RET controller (not shown) to activate the drive motor 310 so that the drive shaft 312 rotates in the clockwise direction, thereby rotating the bevel gear 314 in the clockwise direction. The bevel gear 314 rotates the bevel gear 372 and hence rotates the worm gear shaft 370 in the counter-clockwise direction. The bevel gear 378 on the worm gear shaft 370 rotates the bevel gear 332, thereby rotating the cam shaft 330 in the clockwise direction. However, due to the one-way bearing 334, the cam support 333 will not rotate in response to the clockwise rotation of the cam shaft 330, and hence the cams 336 (and the selection system 320) will remain inactive.

The worm gear 374 rotates in response to the counter-clockwise rotation of the worm gear shaft 370, which in turn causes the drive wheel 380 to rotate in the counter-clockwise direction. As the drive wheel 380 rotates, the pin 384 moves within the slot 396 and thereby pushes the drive block 390 to move along the rails 308 in either the forward direction or the backward direction, depending upon the initial position of the drive wheel 380. Once the drive block 390 has been pre-positioned, the drive motor 310 is turned off.

While the above-described pre-positioning operations may be performed in some embodiments, in other embodiments such pre-positioning may not be necessary. For example, as shown in FIG. 4D, the notches 172 in the mechanical linkages 170 may each be designed to be between two upwardly-extending nubs 176. As the drive block 390 is moved, the downward protrusion 394 in the channel 392 corresponding to the selected mechanical linkage 170 will contact one of the upwardly extending nubs 176 and the back portion of the mechanical linkage 170 will be forced downwardly, allowing the protrusion 394 to move past the nub 176 so as to be received within the notch 172. Once the protrusion 394 is within the notch 172, movement of the drive block 390 will be transferred to the mechanical linkage 170. Thus, it will be appreciated that, depending upon the particular design, pre-positioning of the drive block 390 with respect to the selected mechanical linkage 170 may or may not be necessary.

A RET controller (not shown in the drawings) may activate the drive motor 310 so that the drive shaft 312 rotates in the counter-clockwise direction, thereby rotating the bevel gear 314 in the counter-clockwise direction. The bevel gear 314 rotates the bevel gear 372 and hence rotates the worm gear shaft 370 in the clockwise direction. Due to the one-way bearing 376, the worm gear 374 will not rotate in response to clockwise rotation of the worm gear shaft 370, and hence the drive system 360 will remain inactive.

As the worm gear shaft 370 rotates in the clockwise direction, the bevel gear 378 on the worm gear shaft 370 rotates the bevel gear 372, thereby rotating the cam shaft 330 in the counter-clockwise direction. The one-way bearing 334 rotates the cam support 333, and hence the cams 336, in response to counter-clockwise rotation of the cam shaft 330. The drive motor 310 turns the drive shaft 312 in the clockwise direction until the cam 336 associated with the mechanical linkage 170 that is connected to the phase shifter 150 that is to be adjusted is rotated to the "12:00 position" (i.e., a position where the cam 336 is pointing upwardly). Herein the mechanical linkage 170 that is to be adjusted may be referred to as the "selected mechanical linkage" and the cam 336 associated with the selected mechanical linkage 170 may be referred to as the "selected cam." As the cam support 333 rotates, the cams 336 rotate, and as each cam 336 reaches the 12:00 position it pushes its associated selection element 340 upwardly. As each cam 336 rotates past its associated selection element 340, the springs 354 pull the cam 336 back downwardly, which allows the selection element 340 associated with the cam 336 to fall back into place. The drive motor 310 turns the drive shaft 312 in the clockwise direction until the selected cam 336 reaches the 12:00 position and pushes its associated selection element 340 upwardly, at which point the controller shuts off the drive motor 310.

The selection elements 340 are positioned directly underneath the respective mechanical linkages 170, but are not attached thereto. As the selection element 340 associated with the selected cam 336 is pushed upwardly, the selected mechanical linkage 170 is likewise pushed upwardly so that the protrusion 394 in the channel 392 that receives the selected mechanical linkage 170 is received within the notch 172 in the selected mechanical linkage 170. The remainder of the mechanical linkages 170 remain in their resting (downward) positions, and hence the notches 172 on the remainder of the mechanical linkages 170 do not receive the protrusions 394 that extend downwardly in their respective channels 392 in the drive block 390.

The RET controller then activates the drive motor 310 so that the drive shaft 312 rotates in the clockwise direction, thereby rotating the bevel gear 314 in the clockwise direction. The bevel gear 314 rotates the bevel gear 372 and hence rotates the worm gear shaft 370 in the counter-clockwise direction. The bevel gear 378 on the worm gear shaft 370 rotates the bevel gear 332, thereby rotating the cam shaft 330 in the clockwise direction. However, due to the one-way bearing 334, the cam support 333 will not rotate in response to the clockwise rotation of the cam shaft 330, and hence the cams 336 (and the selection system 320) will remain inactive.

The worm gear 374 rotates in response to the clockwise rotation of the worm gear shaft 370, which in turn causes the drive wheel 380 to rotate in the counter-clockwise direction. As noted above, the drive block 390 is mounted on rails 308. As the drive wheel 380 rotates, the pin 384 moves within the slot 396 and thereby pushes the drive block 390 either forwardly or backwardly, depending upon the initial position of the drive wheel 380, in the manner discussed above. Since the protrusion 394 associated with the selected mechanical linkage 170 is received within the notch 172 in the selected mechanical linkage 170, the forward or backward movement of the drive block 390 is transferred to the selected mechanical linkage 170. The drive wheel 380 is rotated an amount that corresponds to an amount of movement of the selected mechanical linkage 170 that will result in a desired amount of movement of the phase shifter(s) 150 that are attached to the selected mechanical linkage 170 in order to achieve a desired downtilt for one of the linear arrays 120 of the base station antenna 100.

As noted above, the pin 384 may be positioned at or near the outer diameter of the drive wheel 380. Accordingly, the amount of forward and backward movement of the drive block 390 may approximately correspond to the diameter of the drive wheel 380 in some embodiments. The diameter of the drive wheel 380 may be selected to be at least as large as the range of linear motion that is required for the moveable element (e.g., wiper arm) of the phase shifter 150.

Thus, as described above, the multi-RET actuator 300 may be controlled to move a selected one of a plurality of mechanical linkages 170 to adjust a phase shifter 150 on a base station antenna 100 in order to, for example, apply or adjust a phase taper to the sub-components of RF signals that are transmitted and received through a linear array 120 of radiating elements 130 that is associated with the phase shifter 150. The multi-RET actuator 300 may thus be used to control a large number of phase shifters 150, and hence a large number of linear arrays 120, on a base station antenna 100.

Figure 5:
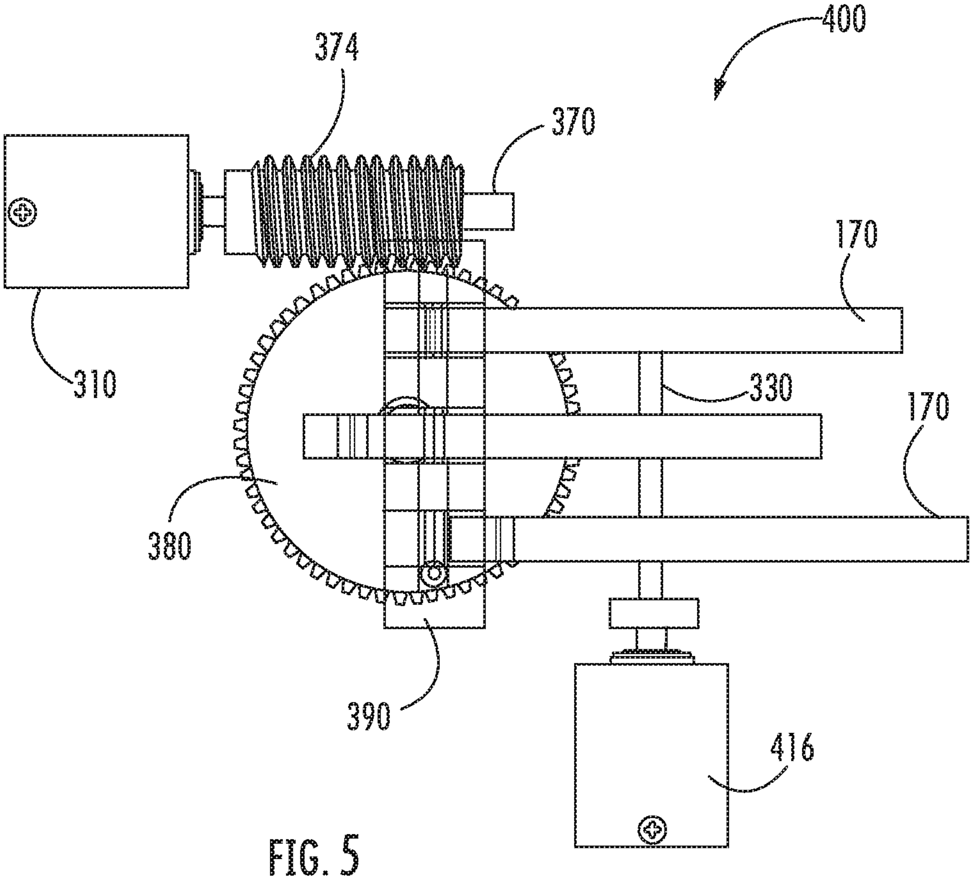
FIG. 5 is a perspective view of a multi-RET actuator according to further embodiments of the present invention that includes both a drive motor and a stepper motor.

It will be appreciated that many modifications may be made to the multi-RET actuator 300 without departing from the scope of the present invention. For example, FIG. 5 illustrates a multi-RET actuator 400 according to further embodiments of the present invention. As shown in the FIG. 5, the multi-RET actuator 400 is very similar to the multi-RET actuator 300, but the multi-RET actuator further includes a stepper motor 416 that is connected to the cam shaft 330. The stepper motor 416 may be used to rotate the cam shaft 330 instead of using the drive motor 310 to rotate the cam shaft 330 through a series of bevel gears 378, 332. Accordingly, in the embodiment of FIG. 5, the one-way bearings 376, 334 and the bevel gears 378, 332 may be omitted (and the drive motor 310 may now rotate the drive wheel 380 in either direction). It will likewise be appreciated that the embodiment of FIG. 5 may be modified by relocating the drive motor 310 to be underneath the drive wheel 380 so that the drive wheel 380 may be mounted directly on the drive shaft 312 of the drive motor 310. In such a modified embodiment, the bevel gears 314, 372 may likewise be omitted.

Figures 6, 7:
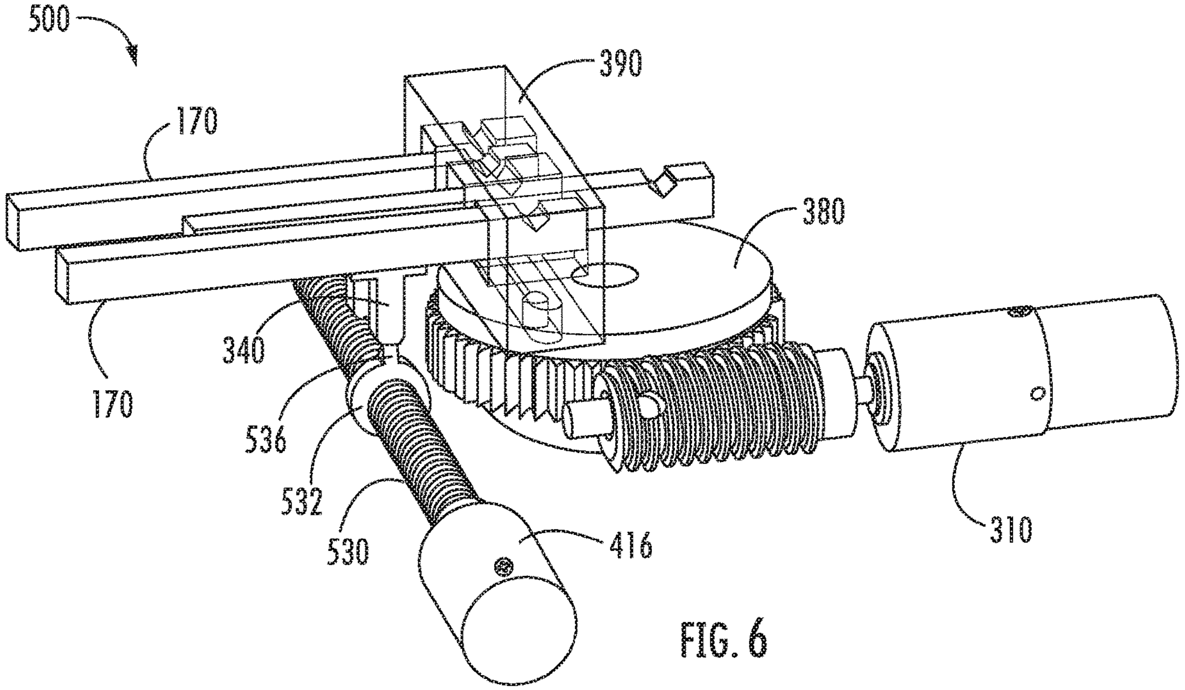
FIG. 6 is a perspective view of a modified version of the multi-RET actuator of FIG. 5 that includes a modified selection mechanism according to further embodiments of the present invention.
FIG. 7 is a flow chart illustrating a method of adjusting a phase shifter of a base station antenna according to still further embodiments of the present invention.

FIG. 6 is a perspective view of a multi-RET actuator 500 according to further embodiments of the present invention. As can be seen, the multi-RET actuator 500 is similar to the multi-RET actuator 400 of FIG. 5, except that the multi-RET actuator 500 replaces the cam shaft 330, cam support 333 and cams 336 of the multi-RET actuator 400 with a threaded shaft 530 having a drive nut 532 mounted thereon. The drive nut 532 is configured (e.g., via internal threads) to move axially relative to the threaded shaft 530 upon rotation of the threaded shaft 530. A rod (not shown) is attached to the drive nut 532. The rod is captured within a guide structure (not shown) that allows the rod to move longitudinally. The guide structure prevents movement of the rod in other directions so that rotation of the threaded shaft 530 will result in the drive nut 532 moving longitudinally along the threaded shaft 530. The direction of movement of the drive nut 532 can be reversed by reversing the direction of rotation of the stepper motor 416. A selector 536 (which can be any upwardly protruding member) protrudes upwardly from the drive nut 532.

The multi-RET actuator 500 may select one of the mechanical linkages 170 for adjustment as follows. The selector motor 416 turns in a first direction which rotates the threaded shaft 530 in the first direction. As the rod and guide structure mounted on the drive nut 532 prevent rotation of the drive nut 532, the drive nut 532 moves longitudinally along the threaded shaft 530 in response to rotation of the threaded shaft 530. The direction that the drive nut 532 moves (i.e., either forward or backward) along the threaded shaft 530 may be selected based on the direction of rotation of the stepper motor 416. As the drive nut 532 moves along the threaded shaft 530, the selector 536 mounted on drive nut 532 will serially engage the nubs 344 on each of the selection elements 340. As the selector 536 engages each selection element 340, the selection element 340 is pushed upwardly, which in turn pushes the associated mechanical linkage 170 upwardly so that the notch 172 on the associated mechanical linkage 170 receives the protrusion 394 in the channel 392 holding the associated mechanical linkage 170. The stepper motor 416 turns until a desired one of the mechanical linkages 170 has been selected in this fashion. The drive system 360 may then operate in the manner discussed above to adjust the position of the selected mechanical linkage 170.

In some embodiments, the rotatable element (e.g., the drive wheel 380) may only rotate in one direction, such as with the multi-RET actuator 300. In such embodiments, depending upon the location of the pin 384, it may be necessary to move a selected mechanical linkage 170 through the full range of tilt in order to adjust the phase shifter 150 attached thereto. This may be problematic, because such a large change in the tilt angle may be sufficient that calls will be dropped during adjustment process. One way of reducing the risk of such dropped calls is to preposition the drive wheel 380 so that the selected mechanical linkage 170 will not have to move through the full range of movement.

It will be appreciated that many different modifications may be made to the above-described multi-RET actuators without departing from the scope of the present invention. As one example, the positions of the drive motors 310 and/or stepper motors 416 may be changed. For example, the drive motor 310 could be positioned underneath the drive wheel 380 and the drive wheel 380 could be mounted on the drive shaft 312. In such embodiments, the worm gear 374 may be omitted, as can the teeth 382 on the drive wheel 380. The center portion of the drive wheel 380 may be omitted to reduce material costs and weight. The drive wheel may be replaced by any suitable rotatable element (e.g., a star-shaped or arbitrarily shaped structure that rotates about an axis of rotation). In still other embodiments, the worm gear 374 and worm gear shaft 370 could be replaced with a slide-crank mechanism. In other embodiments, the cam shaft 330, cam support 333 and cams 336 could be replaced with a reciprocating barrel cam that would operate in a manner similar to the worm gear based selection mechanism included in the multi-RET actuator 500 described above.

Likewise, the positions of the motors and shafts could be rearranged in a wide variety of ways, and a wide variety of different gearing arrangements may be used to transfer the rotational movement of the motor(s) to the various shafts. The cams 336 may also be implemented in a wide variety of ways. For example, the distinct cams 336 used in the multi-RET actuators 300, 400, 500 could be replaced with an external helical thread, with different parts of the thread forming the cams 336. Any appropriate individual pieces or integrated molded or machined parts, for example, may be used to form the cams 336.

Likewise, while a pin-and-slot mechanism is used in the drive system to translate the rotational movement of the drive wheel 380 into longitudinal movement of the drive block 390, it will be appreciated that other mechanisms may be used in further, embodiments, such as a slide-crank mechanism or a barrel cam.

The multi-RET actuators according to embodiments of the present invention have various advantages over conventional multi-RET actuators. The multi-RET actuators are relatively simple in operations, and have a relatively low number of moving parts. The design is expandable to accommodate any number of mechanical linkages (up to some maximum given a particular design, such as, for example, twelve mechanical linkages), and hence it is easy to inventory multi-RET actuators that control different numbers of mechanical linkages since only a few of the parts (e.g., the drive block and the cam shaft) change based on the number of mechanical linkages. The multi-RET actuators may be very compact, and may have a low profile which allows them to readily be installed in a wide variety of different base station antennas.

The multi-RET actuators according to embodiments of the present invention are suitable for use in base station antennas. The base station antennas may include any number of arrays of radiating elements (which can, but do not have to be, linear arrays of radiating elements), and the multi-RET actuators may be used to control phase shifters that are associated with the arrays of radiating elements.

In some embodiments, the multi-RET actuators according to embodiments of the present invention may include a drive block, a drive wheel and a mechanical linkage selection system that is configured to move a selected one of the mechanical linkages of the base station antenna into engagement with the drive block. In these embodiments, the drive block may be configured to move linearly in response to rotation of the drive wheel to move the selected one of the mechanical linkages.

In other embodiments, the multi-RET actuators according to embodiments of the present invention may include a drive system having a drive element and a mechanical linkage selection system that is configured to move a selected one of the mechanical linkages in a first direction to engage the drive element, and the drive element is configured to move the selected one of the mechanical linkages in a second direction that is different from the first direction.

In still other embodiments, the multi-RET actuators according to embodiments of the present invention may include a wheel having a pin extending upwardly therefrom and a block having a slot mounted above the wheel, where the pin is received within the slot so that rotation of the wheel results in linear movement of the block. A selected one of a plurality of mechanical linkages may be engaged with the block so that the linear movement of the block is transferred to the selected one of the mechanical linkages.

Pursuant to further embodiments of the present invention, methods of adjusting a phase shifter of a base station antenna are provided. FIG. 7 is a flow chart that illustrates one such method according to embodiments of the present invention. As shown in FIG. 7, operations may begin with a motor being rotated in a first direction to drive a selection system to move a selected one of a plurality of mechanical linkages into engagement with a drive system (Block 600). The motor is then rotated in a second direction that is opposite the first direction to move the selected one of the mechanical linkages (Block 610).

In some embodiments, rotating the motor in a second direction that is opposite the first direction to move the selected one of the mechanical linkages may comprise rotating the motor in the second direction to rotate a rotatable element having a pin mounted thereon and providing a drive block that is mounted for movement along an axis above the rotatable element, the drive block including a slot in a lower surface thereof and the pin received within the slot so that rotation of the rotatable element results in movement of the drive block.

In some embodiments, rotating a motor in a first direction to drive a selection system to move a selected one of a plurality of mechanical linkages into engagement with a drive system may comprise rotating the motor in the first direction to rotate a cam shaft having a plurality of longitudinally and angularly offset cams mounted thereon and then halting rotation of the motor when a selected one of the cams engages a selection element that is disposed between the selected one of the cams and a selected one of the mechanical linkages, where the selected one of the cams pushes the selection element and the cams engages a selection element that is disposed between the selected one of the cams and a selected one of the mechanical linkages upwardly so that the selected one of the mechanical linkages engages the drive block.

The present invention has been described above with reference to the accompanying drawings. The invention is not limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Spatially relative terms, such as “under”, “below”, “lower”, “over”, “upper”, “top”, “bottom” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “under” or “beneath” other elements or features would then be oriented “over” the other elements or features. Thus, the exemplary term “under” can encompass both an orientation of over and under. The device may be otherwise oriented (rotated 90 degrees or at other orientations) and the spatially relative descriptors used herein interpreted accordingly.

Herein, the terms “attached”, “connected”, “interconnected”, “contacting”, “mounted” and the like can mean either direct or indirect attachment or contact between elements, unless stated otherwise.

Well-known functions or constructions may not be described in detail for brevity and/or clarity. As used herein the expression “and/or” includes any and all combinations of one or more of the associated listed items.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises”, “comprising”, “includes” and/or “including” when used in this specification, specify the presence of stated features, operations, elements, and/or components, but do not preclude the presence or addition of one or more other features, operations, elements, components, and/or groups thereof.

Components of the various embodiments of the present invention discussed above may be combined to provide additional embodiments. Thus, it will be appreciated that while a component or element may be discussed with reference to one embodiment by way of example above, that component or element may be added to any of the other embodiments.

That which is claimed is:

1. A base station antenna, comprising:

a remote electronic tilt ("RET") actuator;

a plurality of phase shifters;

a plurality of mechanical linkages, each mechanical linkage connected between the RET actuator and a respective one or more of the phase shifters, wherein the RET actuator comprises:

a drive element;

a rotatable element; and a mechanical linkage selection system that is configured to move a selected one of the mechanical linkages into engagement with the drive element, wherein the drive element is configured to move linearly in response to rotation of the rotatable element to move the selected one of the mechanical linkages.

2. The base station antenna of claim 1, wherein the drive element comprises a drive block, and the rotatable element comprises a drive wheel.

3. The base station antenna of claim 2, wherein the drive block includes a slot, and the drive wheel includes a pin that is received within the slot.

4. The base station antenna of claim 3, wherein the pin moves reciprocally within the slot in response to rotation of the drive wheel.

5. The base station antenna of claim 2, the RET actuator further comprising a drive motor having a drive shaft that is configured to rotate a worm gear shaft having a worm gear mounted thereon that is configured so that rotation of the worm gear rotates the drive wheel.

6. The base station antenna of claim 1, wherein the mechanical linkage selection system comprises a rotating cam shaft having a plurality of longitudinally and angularly offset cams mounted thereon.

7. The base station antenna of claim 5, wherein the mechanical linkage selection system further comprises a plurality of selection elements, wherein each selection element is mounted between a respective one of the mechanical linkages and a respective one of the cams, and wherein each selection element is configured to move a respective one of the mechanical linkages when engaged by a respective one of the cams.

8. The base station antenna of claim 7, the RET actuator further comprising one or more springs that bias the selection elements downwardly.

9. The base station antenna of claim 1, wherein the mechanical linkage selection system comprises a threaded shaft having an internally-threaded drive nut mounted thereon and a selector mounted on the internally-threaded drive nut.

10. A base station antenna, comprising:

a remote electronic tilt ("RET") actuator;

a plurality of phase shifters;

a plurality of mechanical linkages, each mechanical linkage connected between the RET actuator and a respective one of the phase shifters, wherein the RET actuator comprises:

a drive system having a drive element; and a mechanical linkage selection system that is configured to move a selected one of the mechanical linkages in a first direction to engage the drive element;

wherein the drive element is configured to move the selected one of the mechanical linkages in a second direction that is different than the first direction.

11. The base station antenna of claim 10, wherein the drive element comprises a drive block that mates with the selected one of the mechanical linkages so that movement of the drive block is transferred to the selected one of the mechanical linkages.

12. The base station antenna of claim 11, wherein the drive system further comprises a rotatable element, and wherein the drive block is configured to move in the second direction in response to rotation of the rotatable element.

13. The base station antenna of claim 12, wherein the drive block includes a slot, and the rotatable element has a pin that is received within the slot and that is configured to move reciprocally within the slot in response to rotation of the rotatable element.

14. The base station antenna of claim 10, wherein the mechanical linkage selection system further comprises a plurality of selection elements, and wherein each selection element is mounted below a respective one of the mechanical linkages and configured to move a respective one of the mechanical linkages upwardly.

15. The base station antenna of claim 14, wherein the mechanical linkage selection system further comprises at least one cam that is configured to move a selected one of the selection elements upwardly to move the selected one of the mechanical linkages into engagement with the drive element.

16. The base station antenna of claim 15, wherein the mechanical linkage selection system further comprises a cam shaft having a cam support mounted thereon, and the at least one cam comprises a plurality of longitudinally and angularly offset cams that are mounted on the cam support.

17. The base station antenna of claim 16, further comprising a worm gear shaft having a worm gear mounted thereon that is configured to rotate the rotatable element, and wherein the worm gear shaft includes a gear that is configured to rotate the cam shaft.

18. The base station antenna of claim 17, wherein the worm gear shaft includes a one-way bearing so that the worm gear only rotates in response to rotation of the worm gear shaft in a first direction, and further wherein the cam support includes a one-way bearing so that the cam support only rotates in response to rotation of the worm gear shaft in a second direction that is opposite the first direction.

19. A base station antenna, comprising:

a remote electronic tilt ("RET") actuator;

a plurality of phase shifters; and a plurality of mechanical linkages, each mechanical linkage connected between the RET actuator and a respective one of the phase shifters, wherein the RET actuator comprises:

a rotatable element having a pin extending upwardly therefrom;

a block having a slot mounted above the rotatable element, wherein the pin is received within the slot so that rotation of the rotatable element results in linear movement of the block.

20. The base station antenna of claim 19, wherein the rotatable element comprises a drive wheel, and wherein the pin moves reciprocally within the slot in response to rotation of the drive wheel.

21. The base station antenna of claim 19, wherein the RET actuator further comprises:

a rotating cam shaft having a plurality of longitudinally and angularly offset cams mounted thereon; and a plurality of selection elements, wherein each selection element is mounted between a respective one of the mechanical linkages and a respective one of the cams, and wherein each selection element is configured to move a respective one of the mechanical linkages when engaged by a respective one of the cams.

22. The base station antenna of claim 19, wherein the RET actuator further comprises:

a plurality of selection elements; and a threaded shaft having an internally-threaded element mounted thereon and a selector mounted on the internally-threaded element, wherein each selection element is configured to move a respective one of the mechanical linkages when engaged by the selector.

23. A base station antenna, comprising:

a remote electronic tilt ("RET") actuator;

a plurality of phase shifters; and a plurality of mechanical linkages, each mechanical linkage connected between the RET actuator and a respective one of the phase shifters, wherein the RET actuator comprises:

a drive system having a drive block that is configured to move along an axis, the drive block including a plurality of channels that receive respective ones of the mechanical linkages; and a mechanical linkage selection system that is configured to move a selected one of the mechanical linkages into engagement with the drive block so that movement of the drive block is transferred to the selected one of the mechanical linkages.

24. The base station antenna of claim 23, wherein the drive system further comprises a rotatable element that rotates in response to rotation of a drive shaft of a drive motor.

25. The method of claim 24, wherein the drive block includes a slot, and the drive wheel includes a pin that is received within the slot and that moves reciprocally within the slot in response to rotation of the drive wheel.

26. A method of adjusting a phase shifter, the method comprising:

rotating a motor in a first direction to drive a mechanical linkage selection system to move a selected one of a plurality of mechanical linkages into engagement with a drive system;

rotating the motor in a second direction that is opposite the first direction to move the selected one of the mechanical linkages;

wherein rotating the motor in a second direction that is opposite the first direction to move the selected one of the mechanical linkages comprises:

rotating the motor in the second direction to rotate a rotatable element having a pin mounted thereon; and providing a drive block that is mounted for movement along an axis above the rotatable element, the drive block including a slot in a lower surface thereof and the pin received within the slot so that rotation of the rotatable element results in movement of the drive block.

27. The method of claim 26, wherein rotating a motor in a first direction to drive a selection system to move a selected one of a plurality of mechanical linkages into engagement with a drive system comprises:

rotating the motor in the first direction to rotate a cam shaft having a plurality of longitudinally and angularly offset cams mounted thereon;

halting rotation of the motor when a selected one of the cams engages a selection element that is disposed between the selected one of the cams and a selected one of the mechanical linkages, wherein the selected one of the cams pushes the selection element and the cams engages a selection element that is disposed between the selected one of the cams and a selected one of the mechanical linkages upwardly so that the selected one of the mechanical linkages engages the drive block.

* * * * *